US012545237B2

United States Patent
Tashiro et al.

(10) Patent No.: US 12,545,237 B2
(45) Date of Patent: Feb. 10, 2026

(54) VEHICLE CONTROL DEVICE

(71) Applicant: Hitachi Astemo, Ltd., Ibaraki (JP)

(72) Inventors: Naoyuki Tashiro, Tokyo (JP); Masashi Seimiya, Hitachinaka (JP); Satoshi Matsuda, Hitachinaka (JP); Masato Imai, Tokyo (JP)

(73) Assignee: HITACHI ASTEMO, LTD., Ibaraki (JP)

(*) Notice: Subject to any disclaimer, the term of this patent is extended or adjusted under 35 U.S.C. 154(b) by 627 days.

(21) Appl. No.: 17/284,881

(22) PCT Filed: Sep. 26, 2019

(86) PCT No.: PCT/JP2019/037754
§ 371 (c)(1),
(2) Date: Apr. 13, 2021

(87) PCT Pub. No.: WO2020/080054
PCT Pub. Date: Apr. 23, 2020

(65) Prior Publication Data
US 2021/0387614 A1 Dec. 16, 2021

(30) Foreign Application Priority Data
Oct. 16, 2018 (JP) ................ 2018-195374

(51) Int. Cl.
B60W 30/06 (2006.01)
B60W 10/04 (2006.01)
(Continued)

(52) U.S. Cl.
CPC ............ B60W 30/06 (2013.01); B60W 10/04 (2013.01); B60W 10/10 (2013.01); B60W 10/18 (2013.01);
(Continued)

(58) Field of Classification Search
CPC ...... B60W 30/06; B60W 10/04; B60W 10/10; B60W 10/18; B60W 10/20;
(Continued)

(56) References Cited

U.S. PATENT DOCUMENTS

2017/0369071 A1* 12/2017 Gould ................. B60R 25/24
2018/0292822 A1* 10/2018 Ichikawa ........... B60W 60/0059
2019/0039606 A1* 2/2019 Fujita ................. B60W 50/14

FOREIGN PATENT DOCUMENTS

DE 102010038966 A1 * 2/2012 ............ B60W 30/06
JP 2005271866 A * 10/2005
(Continued)

OTHER PUBLICATIONS

JP-2017052470-A translation (Year: 2017).*
(Continued)

Primary Examiner — Jelani A Smith
Assistant Examiner — Gabriel Anfinrud
(74) Attorney, Agent, or Firm — Volpe Koenig

(57) ABSTRACT

A vehicle control device, which reduces intervention in automatic parking by a driver, includes a processor and a memory, that control the vehicle to a target parking position. The vehicle control device includes an obstacle detection unit detecting a position of an obstacle around the vehicle, a travelable region setting unit that determines a region where the vehicle may travel based on the position of the obstacle, and sets the target parking position within the travelable region, a route generation unit that calculates a travel route to the target parking position within the travelable region, and an automatic parking execution unit that causes the vehicle to automatically travel toward the target parking position. When a driver intervenes during the automatic traveling, the route generation unit stores vehicle state information at the time of the intervention, and resets the
(Continued)

travelable region based on the driver operation intervention information.

10 Claims, 19 Drawing Sheets

(51) Int. Cl.
  *B60W 10/10* (2012.01)
  *B60W 10/18* (2012.01)
  *B60W 10/20* (2006.01)
  *B60W 50/00* (2006.01)
  *B60W 50/10* (2012.01)
(52) U.S. Cl.
  CPC ........ *B60W 10/20* (2013.01); *B60W 50/0098* (2013.01); *B60W 50/10* (2013.01); *B60W 2556/10* (2020.02); *B60W 2710/1005* (2013.01); *B60W 2710/18* (2013.01); *B60W 2710/20* (2013.01); *B60W 2720/106* (2013.01); *B60W 2720/125* (2013.01)
(58) Field of Classification Search
  CPC ............. B60W 50/0098; B60W 50/10; B60W 2556/10; B60W 2710/1005; B60W 2710/18; B60W 2710/20; B60W 2720/106; B60W 2720/12; G05D 1/80
  See application file for complete search history.

(56) References Cited

FOREIGN PATENT DOCUMENTS

| JP | 2013-082376 A | | 5/2013 |
| JP | 2017052470 A | * | 3/2017 |
| JP | 2018-012451 A | | 1/2018 |

OTHER PUBLICATIONS

JP-2005271866-A (Year: 2015).*
DE-102010038966-A1 translation (Year: 2012).*
Translation of JP2005271866A (Year: 2005).*
Translation of JP2017052470A (Year: 2017).*
PCT/JP2019/037754 International Search Report, Jan. 7, 2020, 2pgs.

* cited by examiner

VEHICLE CONTROL DEVICE

TECHNICAL FIELD

The present invention relates to a vehicle control device that assists in parking a vehicle.

BACKGROUND ART

Advanced drive assistance systems have been developed to prevent traffic accidents and reduce the driving load on a driver during traffic jams. One of the advanced drive assistance systems includes is automatic parking. In automatic parking, when the driver specifies a target parking position, the vehicle control device automatically performs some or all of the accelerator, brake, and steering operations to park the vehicle.

A vehicle that provides automatic parking includes sensing devices such as a camera and an ultrasonic sensor that grasp the surrounding environment of the vehicle, and the control device calculates the travelable region based on the position information (sensor information) of an obstacle (parked vehicle, and the like) acquired from the sensing device. Next, the control device calculates the turning position and the like based on the calculated travelable region, calculates the planned movement route to the target parking position, and when the route search is successful, the vehicle follows the route. However, the travelable region is determined by the control device based on the position information, and it may give a sense of discomfort when it does not match the driver's sensibility (for example, the speed when passing near an obstacle is high).

In order to solve to this problem, PTL 1 discloses a technique for correcting the upper limit speed of running during automatic parking according to the accelerator or brake operation of the driver.

CITATION LIST

Patent Literature

PTL 1: JP 2013-082376 A

SUMMARY OF INVENTION

Technical Problem

Although PTL 1 discloses a technology for adjusting only the traveling speed to match the driver's sensibility based on the driver's accelerator and brake operation, the allowable value of the distance to the obstacle depends on the driver. In addition, depending on the type of obstacle, it may be difficult to sense it with a camera or an ultrasonic sensor (pole, fence, and the like), and it is possible that the vehicle gets too close to the obstacle.

For example, when the control device of the above-mentioned conventional example controls the vehicle toward the target turning position by automatic parking, when the driver feels too close to the obstacle before the target turning position, the driver operates the brakes to stop the vehicle.

The control device then regenerates the route from the stop position. Since the travelable region calculated by the control device is set based on the sensor information, the travelable region does not change unless the sensor information is changed.

Therefore, the above-mentioned conventional control device may generate a route in which the vehicle approaches the obstacle again. In this case, it is necessary for the driver to stop the vehicle by the brake again and perform a shift operation or a steering operation. As a result, there is a problem that the driver feels uncomfortable when the vehicle approaches the obstacle many times, and the frequency of brake and shift operations and steering operations by the driver increases, resulting in deterioration of operability.

Solution to Problem

The present invention relates to a vehicle control device that includes a processor and a memory, that is mounted in a vehicle, and that controls the vehicle to a target parking position, and the vehicle control device includes an obstacle detection unit that detects a position of an obstacle around the vehicle, a travelable region setting unit that sets a region where the vehicle is configured to travel as a travelable region based on the position of the obstacle, and that sets the target parking position within the travelable region, a route generation unit that calculates a travel route to the target parking position within the travelable region, and an automatic parking execution unit that causes the vehicle to automatically travel toward the target parking position based on the travel route, wherein when a driver intervenes in a driving operation during the automatic traveling, the route generation unit stores vehicle state information at a time of the intervention in driver operation intervention information, and resets the travelable region based on the driver operation intervention information.

Advantageous Effects of Invention

According to the present invention, it is possible to reduce the intervention in the automatic parking by the driving operation by the driver, and to improve the safety and operability of the automatic parking.

Details of at least one practice of the subject matter disclosed herein are set forth in the accompanying drawings and in the description below. Other features, aspects, and effects of the disclosed subject matter are manifested in the disclosures, drawings, and claims below.

DESCRIPTION OF EMBODIMENTS

Example 1

Figure 1:
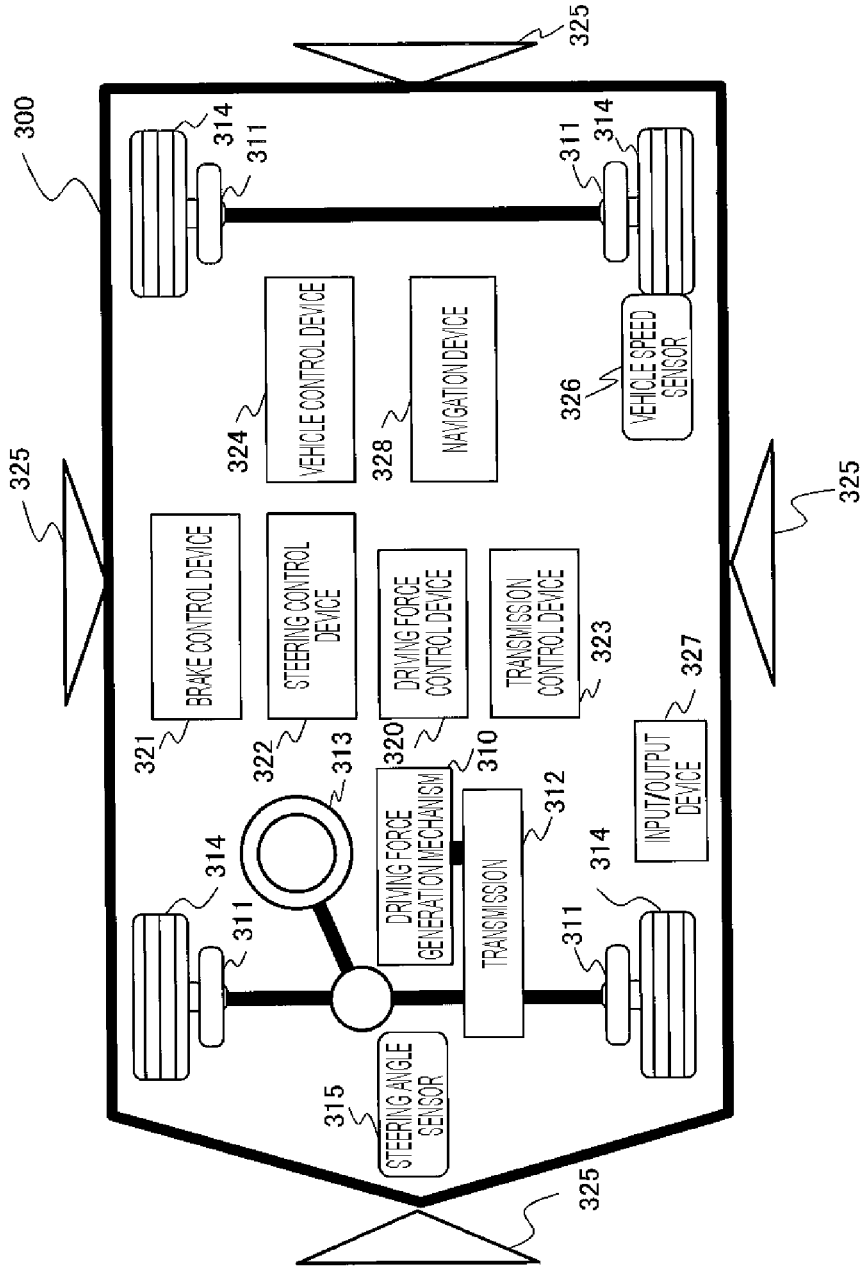
FIG. 1 is a block diagram showing Example 1 of the present invention and showing a configuration of a vehicle including a vehicle control device.

FIG. 1 is a block diagram showing a configuration of a vehicle including a vehicle control device 324 according to Example 1 of the present invention.

A vehicle 300 includes a driving force generation mechanism 310, which is a power source, a brake 311 that brakes the vehicle, and a transmission 312 having a transmission mechanism that switches the driving force generated by the driving force generation mechanism 310 in an appropriate direction and moves the vehicle forward or backward. The output of the transmission 312 rotates the left and right wheels 314 to drive the vehicle 300, and the brake 311 is controlled to generate a braking force to decelerate the vehicle 300.

The driving force generation mechanism 310 may be an engine, a hybrid mechanism of an engine and a motor, or a single motor. The vehicle 300 includes a steering wheel 313, and by operating the steering wheel 313, the steering angle of the wheels 314 is changed, and the vehicle 300 turns.

A control device is connected to each actuator. A driving force control device 320 controls the driving force generated by the driving force generation mechanism 310. A transmission control device 323 switches the vehicle forward or backward and controls the gear ratio. A brake control device 321 controls the brake 311 so that a predetermined braking force is generated.

A steering control device 322 controls the steering wheel 313 so that the steering angle is a predetermined steering angle even when the driver does not operate the steering wheel 313.

The vehicle 300 includes a plurality of surrounding state recognition sensors 325, which recognize the vehicle's surroundings, a vehicle speed sensor 326 that acquires vehicle speed information, a steering angle sensor 315 that detects the steering angle of the steering wheel 313. In addition, the vehicle 300 includes a navigation device 328 that detects the position of the vehicle using a global positioning system (GPS).

In the illustrated example, the surrounding state recognition sensors 325 are installed at the front of, at the rear of, and at the sides of the vehicle 300.

The surrounding state recognition sensor 325 includes a camera, a sonar, or the like to detect obstacles and white lines around the vehicle 300. Further, the surrounding state recognition sensor 325 may include an optical distance measuring device and an electromagnetic wave distance measuring device. In addition, the surrounding state recognition sensor 325 functions as an obstacle position detection unit.

In addition, the vehicle speed sensor 326 that acquires speed information of the vehicle 300 is not limited to a sensor using wheel speed pulse information. Respective control devices may indirectly calculate the speed using the value detected by the motor resolver rotational speed sensor, the rotational speed sensor of the transmission 312 or the like.

The vehicle control device 324 receives information from the surrounding state recognition sensor 325, the vehicle speed sensor 326, and the steering angle sensor 315, and transmits the command value to the driving force control device 320, the brake control device 321, the steering control device 322, and the transmission control device 323.

Further, an input/output device 327 is provided which receives an input or a command from the driver of information related to automatic parking and presents the information to the driver. The specific input information includes determining the parking position, starting automatic parking, and the like, and the output information includes the parking frame that is the target parking position, the travel route information, the turning position, and a bird's-eye view that combines images of the area around the vehicle during automatic parking. The input/output device 327 may be included in a navigation device 328. Further, the input/output device 327 can include a touch panel, a microphone, and a speaker.

Figure 2A:
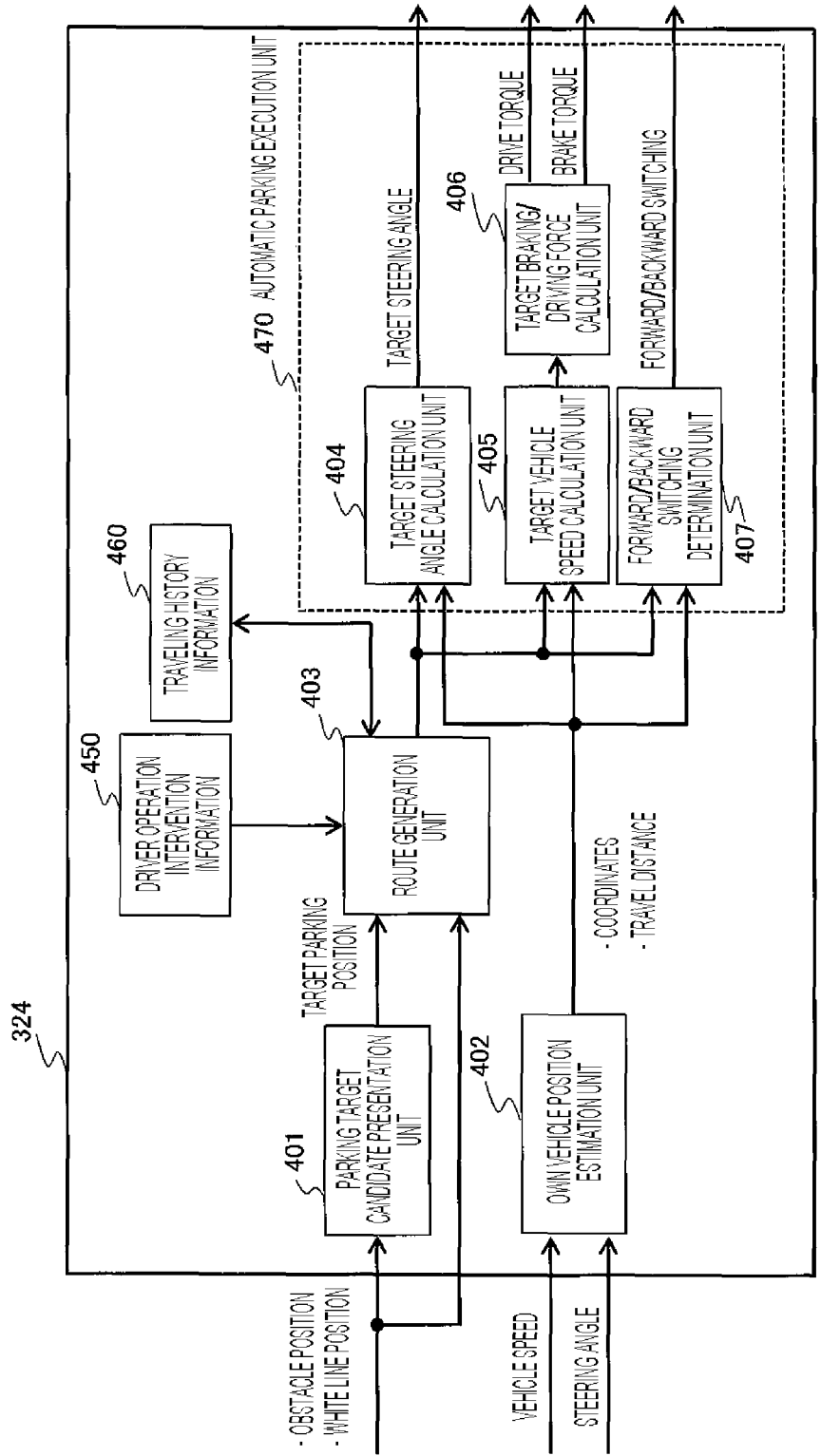
FIG. 2A is a block diagram showing Example 1 of the present invention and showing an example of a function of the vehicle control device.

An example of the function of the vehicle control device 324 in Example 1 of the present invention is shown in the block diagram of FIG. 2A.

A parking target candidate presentation unit 401 calculates an available parking space (target parking position) based on the position of the obstacle and the position of the white line obtained from the surrounding state recognition sensor 325 to output the candidates for the target parking position to the input/output device 327 and presented them to the driver.

Specifically, the candidates for the target parking position are displayed on the screen of the input/output device 327 or the like as a parking frame, or the like, and the driver selects the position intended to be parked from the candidates for the target parking position by touch input or the like on the screen of the input/output device 327.

When calculating the target parking position candidates, the parking target candidate presentation unit (travelable region setting unit) 401 calculates the travelable region as the region where the vehicle 300 can travel from the position of the obstacle and the position of the white line acquired by the surrounding state recognition sensor 325. A well-known or known technique may be applied to the calculation method of the target parking position and a travelable region 104.

When automatic parking is started, a vehicle position estimation unit 402 calculates the position of the vehicle 300, specifically, the coordinates and the travel distance based on the vehicle speed information acquired by the vehicle speed sensor 326 and the steering angle acquired by the steering angle sensor 315, and the travelable region calculated by the parking target candidate presentation unit 401.

A route generation unit 403 calculates the travel route in which the vehicle can move without contacting an obstacle (outer circumference of the travelable region) from the parking start position to the target parking position based on the target parking position, the travelable region, driver operation intervention information 450, and the position of the obstacle. When the route generation unit 403 generates the travel route, it outputs curvature information and a turning position with respect to the travel distance. The travel route generated by the route generation unit 403 includes a turning position for switching the traveling direction from forward to backward (or backward to forward).

The driver operation intervention information 450 is information when the driver intervenes in the automatic parking by the driving operation during automatic parking, and is generated by the route generation unit 403 based on the sensor information. In addition, the route generation unit 403 acquires the distance to each line segment (outer circumference of the travelable region) of the travelable region at predetermined distance intervals during automatic parking, and the position and angle (described later) as the state information of the vehicle 300 to store them in traveling history information 460. The route generation unit 403 resets the travelable region as described later based on the driver operation intervention information 450 and the traveling history information 460.

Further, when detecting a step on the travel route the route generation unit 403 determines whether the vehicle can ride over the step. When it is determined that the vehicle can ride over the step, the route generation unit 403 does not regard the step as an obstacle, and when it is determined that the vehicle cannot ride over the step, it regards the step as an obstacle.

The target steering angle calculation unit 404 calculates the target steering angle based on the curvature information for the travel distance based on the travel route, which is the output result of the route generation unit 403 and the vehicle position, which is the output of the vehicle position estimation unit 402 to transmit it to the steering control device 322. Here, the target steering angle is not limited to the output result of the route generation unit 403, but may be a value obtained by adding the correction value of the steering amount to the output result when the relative relationship with the parking frame or the obstacle is deviated during automatic parking as the target steering angle.

A target vehicle speed calculation unit 405 determines the reference target vehicle speed based on the magnitude of curvature and the position of the obstacle based on the travel route, which is the output result of the route generation unit 403, and the vehicle position, which is the output of the vehicle position estimation unit 402.

The target vehicle speed calculation unit 405 realizes smooth acceleration/deceleration by correcting the target vehicle speed in consideration of acceleration and further the jerk when the reference target vehicle speed changes. The target vehicle speed calculation unit 405 sets a plurality of target vehicle speeds in advance as reference target vehicle speeds, as will be described later.

After the automatic parking is started, the target vehicle speed calculation unit 405 reduces the target vehicle speed when the surrounding state recognition sensor 325 detects a step or a ring clasp on the travel route. As a result, parking can be performed without giving an unpleasant shock to the driver when passing through the step or contacting the ring clasp.

A target braking/driving force calculation unit 406 calculates the required driving force (or braking force) based on the difference between the target vehicle speed and the vehicle speed information (actual vehicle speed). When generating the braking force, the target braking/driving force calculation unit 406 transmits the brake torque to the brake control device 321 and when generating the driving force, it transmits the drive torque to the driving force control device 320.

The target braking/driving force calculation unit 406 corrects the driving force when the surrounding state recognition sensor 325 detects a gradient or a step. Specifically, the target braking/driving force calculation unit 406 corrects the driving force so that the driving force increases when the slope is uphill, and the target braking/driving force calculation unit 406 corrects the driving force so that the driving force decreases when it is downhill. Further, when the surrounding state recognition sensor 325 detects a step or the like, the target braking/driving force calculation unit 406 performs correction so that the higher the step, the larger the driving force. As a result, the target braking/driving force calculation unit 406 can improve the ability to follow the target vehicle speed.

A forward/backward traveling switching determination unit 407 commands that the transmission control device 323 switch between forward traveling and backward traveling based on the turning position on the travel route, which is the output result of the route generation unit 403, and the vehicle position, which is the output of the target vehicle speed calculation unit 405. When the driving force generation mechanism 310 is a motor, a command for switching the rotation direction may be transmitted to the driving force generation mechanism 310.

The target steering angle calculation unit 404, the target vehicle speed calculation unit 405, the target braking/driving force calculation unit 406, and the forward/backward traveling switching determination unit 407 constitutes an automatic parking execution unit 470 that controls the vehicle 300 toward the target parking position along the calculated travel route.

Figure 2B:
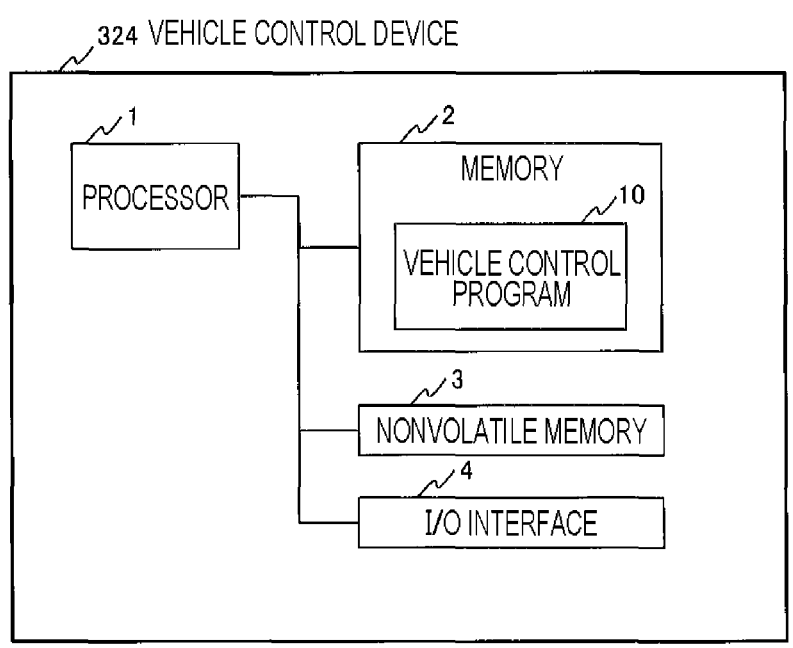
FIG. 2B is a block diagram showing Example 1 of the present invention and showing an example of a configuration of the vehicle control device.

FIG. 2B is a block diagram showing an example of the configuration of the vehicle control device 324. The vehicle control device 324 includes a processor 1, a memory 2, a nonvolatile memory 3, and an I/O interface 4.

A vehicle control program 10 is loaded in the memory 2 and executed by the processor 1. Programs and data are stored in the nonvolatile memory 3. The I/O interface 4 is connected to various sensors and networks. Communication with other control devices is performed via the I/O interface 4.

The vehicle control program 10 includes respective function units of the parking target candidate presentation unit 401, the vehicle position estimation unit 402, the route generation unit 403, the target steering angle calculation unit 404, the target vehicle speed calculation unit 405, the target braking/driving force calculation unit 406, and the forward/backward traveling switching determination unit 407 shown in FIG. 2A.

The processor 1 operates as a function unit that provides a predetermined unit by executing processing according to a program of each function unit. For example, the processor 1 functions as the route generation unit 403 by executing processing according to a route generation program. The same applies to other programs. Further, the processor 1 also operates as a function unit that provides each unit of a plurality of processes executed by each program.

The content of control of the vehicle control device 324 according to Example 1 of the present invention will be described with reference to the flowchart of FIG. 3. This process is performed when an automatic parking command is received from the input/output device 327.

In step S501, the parking target candidate presentation unit 401 calculates the available parking space based on the parking frame information detected by the surrounding state recognition sensor 325 and the vacant space information without an obstacle.

When the available parking space is calculated, the parking target candidate presentation unit 401 displays it on the input/output device 327 as a candidate for the target parking position. When the available parking space is not calculated, the parking target candidate presentation unit 401 ends the process.

In step S502, when the parking target candidate presentation unit 401 accepts the target parking position, from among the candidates for the target parking position, selected by the driver via the input/output device 327, the process proceeds to step S503, and when not accepted, the process waits.

Figure 4A:
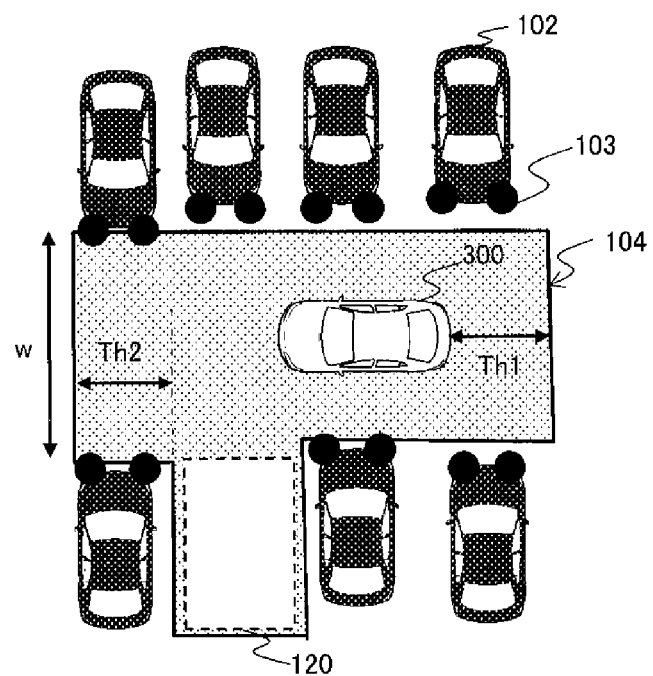
FIG. 4A is a plan view showing Example 1 of the present invention and showing an example of a travelable region based on the position of an obstacle.

In step S503, the route generation unit 403 sets the travelable region 104 based on the above-selected target parking position and position information 103 of an obstacle 102 (see FIG. 4A) acquired by the surrounding state recognition sensor 325. FIG. 4A is a plan view showing an example of the travelable region 104.

Specifically, the route generation unit 403 sets a region in which the T-shape is deformed as a travelable region 104 with the position information of the obstacle 102 closest to the vehicle 300 as an endpoint so as to approximate the shape by the T-shaped plane shape including a parking frame 120 as shown in FIG. 4A.

For example, for a region in front of and a region behind the vehicle 300 where the obstacle 102 is absent or cannot be detected, the route generation unit 403 sets, for the region behind the vehicle, the rear end of the travelable region 104 at a position away from the position of the vehicle 300 by a predetermined value Th1 at the start of automatic parking, and sets, for the region in front of the vehicle, the front end of the travelable region 104 at a position away from the left end of the parking frame 120 in the figure by a predetermined value Th2.

Here, it is desirable to set a value larger than 0 for the predetermined value Th1. However, when there is a waiting vehicle behind the vehicle 300, the route generation unit 403 sets Th1 to 0 to suppress the approach to the following waiting vehicle and does not give the driver a sense of discomfort.

Further, it is desirable to set a value larger than 0 for the predetermined value Th2, and the route generation unit 403 may change if depending on a passage width W. Specifically, the larger the passage width W, the smaller the distance of the predetermined value Th2. As a result, the route generation unit 403 can generate a more natural travel route without the travel route becoming too longer in the forward direction.

Figure 4B:
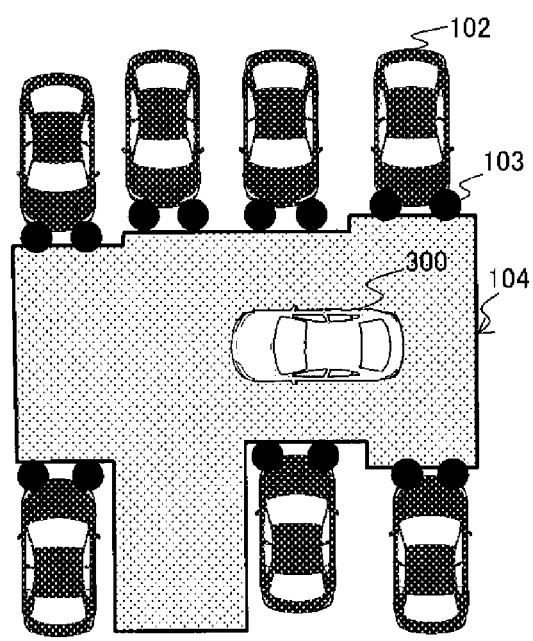
FIG. 4B is a plan view showing Example 1 of the present invention and showing an example of a travelable region based on the position of an obstacle.
Figure 4C:
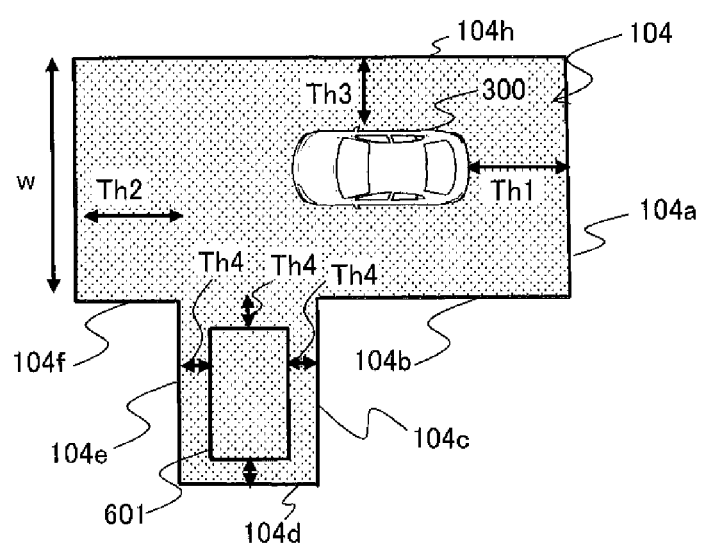
FIG. 4C is a plan view showing Example 1 of the present invention and showing an example of a travelable region based on the position of an obstacle.

FIG. 4C is a plan view showing an example of the travelable region 104. As shown in FIG. 4C, when there is no obstacle 102 and only the target parking frame 601 is determined, the travelable region 104 is set within a position away from the position of the vehicle 300 to the side by a predetermined value Th3.

Here, the predetermined value Th3 is set based on the detection distance of the surrounding state recognition sensor 325. Further, the target parking frame 601 side line segments (104c, 104d, 104e) are set at a position away from the target parking frame 601 by a predetermined value Th4. Here, the predetermined values Th4 for respective line segments 104c to 104d may not be limited to the same value, but may be set to different values.

As described above, the reason why the travelable region 104 has a T-shape is to reduce the calculation load such as route calculation. However, when the performance of the computer of the vehicle control device 324 is high and there is no problem even when the calculation load is high, the region is not limited to have a T-shape. As shown in FIG. 4B, based on the position information 103 of each obstacle 102, a polygonal approximation may be set as the travelable region 104. In the following, the T-shaped region will be used as the travelable region 104.

In step S504, the route generation unit 403 determines whether the driver operation history is stored in the driver operation intervention information 450. The route generation unit 403 advances the process to step S505 when the operation history is stored in the driver operation intervention information 450, and advances the process to step S506 when the driver operation intervention information 450 does not include the operation history.

Here, the driver operation intervention information 450 includes the position and the angle of the vehicle, the distance between the endpoint of the vehicle and the outer circumference of the travelable region (or obstacle) when the driver's driving operation (shift switching operation, accelerator operation, brake operation, or steering operation) occurs.

The angle indicates an angle obtained by intersects the line segment of the outer circumference (or boundary) of the travelable region 104 with the vehicle body center line or the extension line of the vehicle body side face of the vehicle 300. Further, the position relative to the automatic parking start position is used as the position of the vehicle.

Further, when the vehicle control device 324 starts recording the driving operation by the driver from the start of automatic parking, and automatic parking is completed, in the driver operation intervention information 450, the record of the driving operation is automatically deleted. This enables automatic parking according to the characteristics and preferences of different drivers when the drivers drive.

However, when the vehicle control device 324 can acquire GPS information, it is preferable to record the absolute position of the vehicle in the driver operation intervention information 450. As a result, when parking the vehicle in the same parking lot, the initial turning position can be automatically performed by utilizing the past driver operation intervention information 450. In this case, when the route generation unit 403 receives the delete command from the driver, it is possible to provide automatic parking according to the characteristics of different drivers by deleting the driver operation intervention information 450.

In step S505, the route generation unit 403 sets the travelable region based on the driver operation intervention information 450. The route generation unit 403 performs this process only when the operation history is recorded in the driver operation intervention information 450, and when the operation history is not recorded in the driver operation intervention information 450, it sets the travelable region 104 based on the position information 103 of the obstacle 102 acquired by the surrounding state recognition sensor 325 calculated in step S503 above, and the process proceeds to step S506 in which a travel route is generated.

The method of setting the travelable region when the driver operation intervention information 450 includes an operation history will be described with reference to FIGS. 5A to 5C and FIG. 6. 5A to 5C are plan views showing an example of a travelable region based on driver's operation intervention. FIG. 6 is a flowchart showing an example of the travelable region setting process.

Figure 5A:
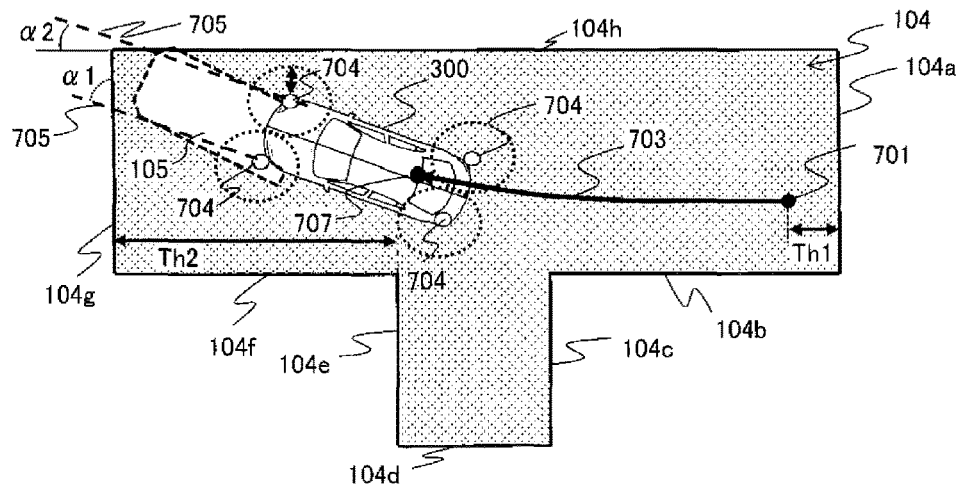
FIG. 5A is a plan view showing Example 1 of the present invention and showing an example of a travelable region based on driver operation intervention information.
Figure 6:
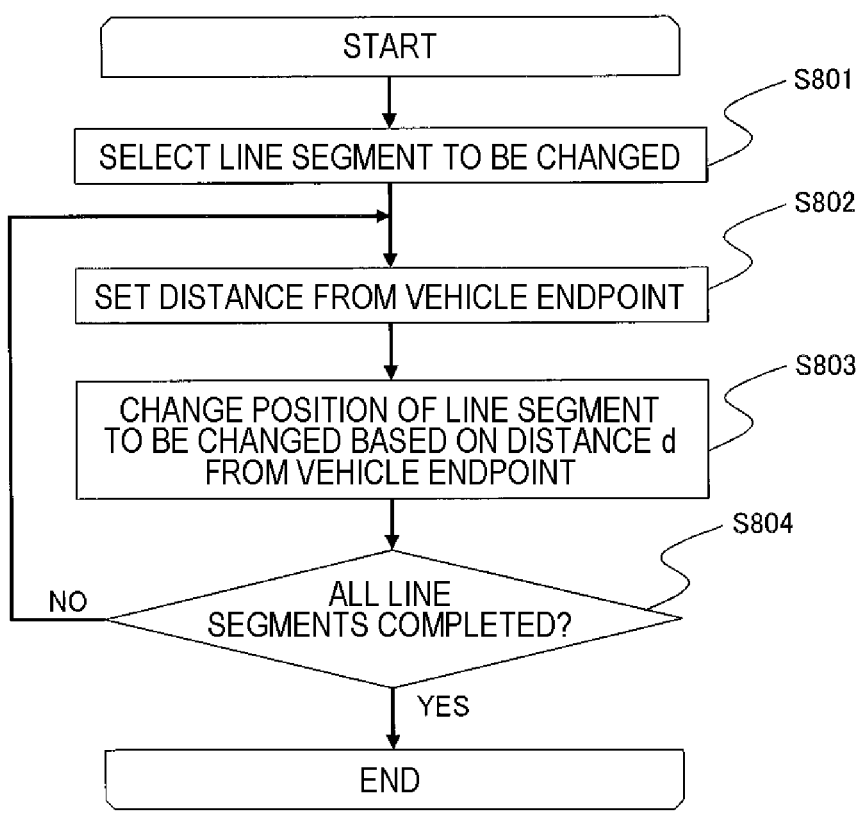
FIG. 6 is a flowchart showing Example 1 of the present invention and showing an example of a setting process of a travelable region based on driver operation intervention information.

As shown in FIG. 5A, the route generation unit 403 calculates the travel route 703 and the turning position 105 based on the travelable region 104 set based on sensor information such as the surrounding state recognition sensor 325 at an automatic parking start position 701 to start automatic traveling. Here, the travelable region 104 based on the sensor information is a region obtained by connecting a line segment 104a to a line segment 104h.

The vehicle control device 324 records an endpoint 704 of the position of the vehicle 300 at which the driver intervened in the driving operation during automatic parking. Here, the timing at which the vehicle control device 324 records the driver operation intervention information 450 is when a shift operation (either from forward to backward or from backward to forward), a brake operation, or a steering operation occurs.

Further, while, in FIG. 5A, four endpoints 704 of the vehicle (front left and front right endpoints and rear left and rear right endpoints) are shown, four or more points may be set depending on the shape of the vehicle as long as at least four points are set.

Next, a specific process in which the route generation unit 403 sets the travelable region based on the driver operation intervention information 450 will be described with reference to FIG. 6. The flowchart of FIG. 6 is performed in step S505 of FIG. 3.

In step S801, the route generation unit 403 selects the line segments 104g and 104h of the travelable region 104 to be changed at a position 707 of the vehicle 300 at which the intervention by the driver in the driving operation occurs based on the angle of the vehicle body (a1, a2 in FIG. 5A), and the traveling direction immediately before the intervention by the driver in the driving operation.

Specifically, the route generation unit 403 performs selection so that a line segment that intersects the outer circumference of the travelable region 104 on a straight line 705 that extends from the vehicle endpoint 704 in FIG. 5A in consideration of the angle of the vehicle 300 in the traveling direction immediately before the intervention by the driver in the driving operation is performed is to be changed. Here, as an example, in the case of FIG. 5A, the line segments to be changed are the line segment 104g and the line segment 104h that intersect the extension of the traveling direction.

FIG. 5A shows an example in which the driver intervenes in the driving operation at the position 707 before the turning position 105.

In step S802, the route generation unit 403 sets the distance r (radius r in FIG. 5B) from each vehicle endpoint 704. Here, the distance r is a preset value, but the distance r does not have to be the same value at all of the vehicle endpoints 704. For example, since the distance to the obstacle is easier to visually recognize when the obstacle is in front of the vehicle 300 and toward the driver's seat, the distance r may be set to be smaller than that at the rear and passenger's seat side endpoint. As a result, it is possible to set the travelable region 104 according to the driver's intention, and giving the driver a sense of discomfort can be suppressed. Here, the distance from the vehicle endpoint 704 is not limited to form a circle, and may be polygonal according to the shape of the vehicle.

In step S803, in order to set the position of the line segment (outer circumference of the travelable region) to be changed, the route generation unit 403 moves the line segment selected in step S801 until the distance r calculated in step S802 is reached.

Figure 5B:
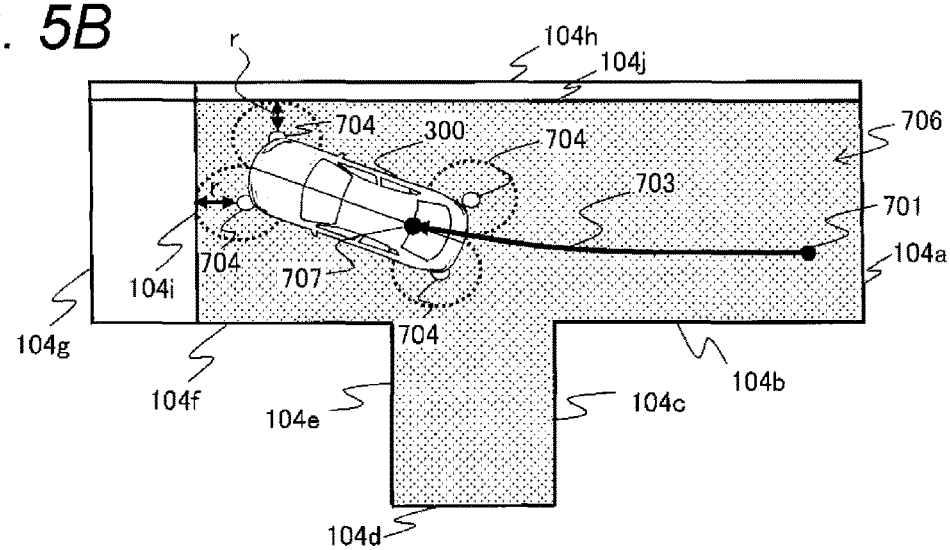
FIG. 5B is a plan view showing Example 1 of the present invention and showing an example of setting of a travelable region based on driver operation intervention information.

Specifically, as shown in FIG. 5B, the route generation unit 403 calculates a circle with radius r around each vehicle endpoint 704, and draws a perpendicular line from the vehicle endpoint 704 to the target line segment, and moves the line segment until the distance from the vehicle endpoint 704 is r. Here, as an example, in the case of FIG. 5B, the line segment 104g is changed to the line segment 104i and the line segment 104h is changed to the line segment 104j, and the travelable region is reduced to a travelable region 706 in the figure.

The travelable region 104 in FIG. 5A is the travelable region set in step 503, and FIG. 5B is the travelable region 706 reset based on the driver operation intervention information 450.

Figure 5C:
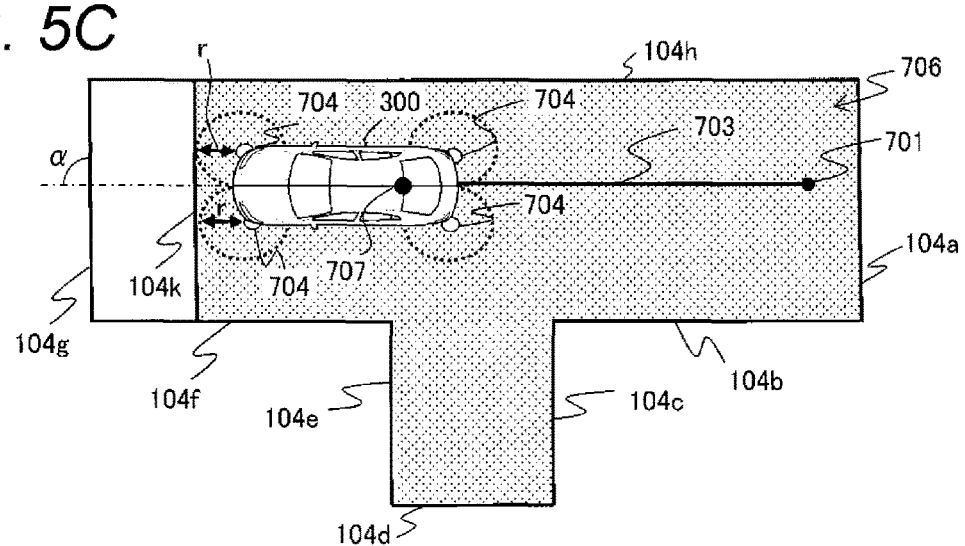
FIG. 5C is a plan view showing Example 1 of the present invention and showing an example of setting of a travelable region based on driver operation intervention information.

Also, as shown in FIG. 5C, when the angle α formed by the line segment at the position 707 of the vehicle 300 at which the intervention by the driver in the driving operation occurs and the extension line of the vehicle body center line is vertical, the route generation unit 403 performs selection so that only the line segment 104g is subject to change, the line segment 104g is changed to the line segment 104k, and the travelable region is the travelable region 706.

In other words, when the vehicle 300 faces the line segment at the position 707 of the vehicle 300 at which the intervention by the driver in the driving operation occurs, the route generation unit 403 may change only the line segment on the extension of the traveling direction.

In step S804, the route generation unit 403 determines whether a change in the position of the line segment selected in step S801 is completed. The route generation unit 403 ends the flowchart when the above process is completed for all the selected line segments, and returns the process to step S802 to repeat the above process when the above process is not completed.

Figure 3:
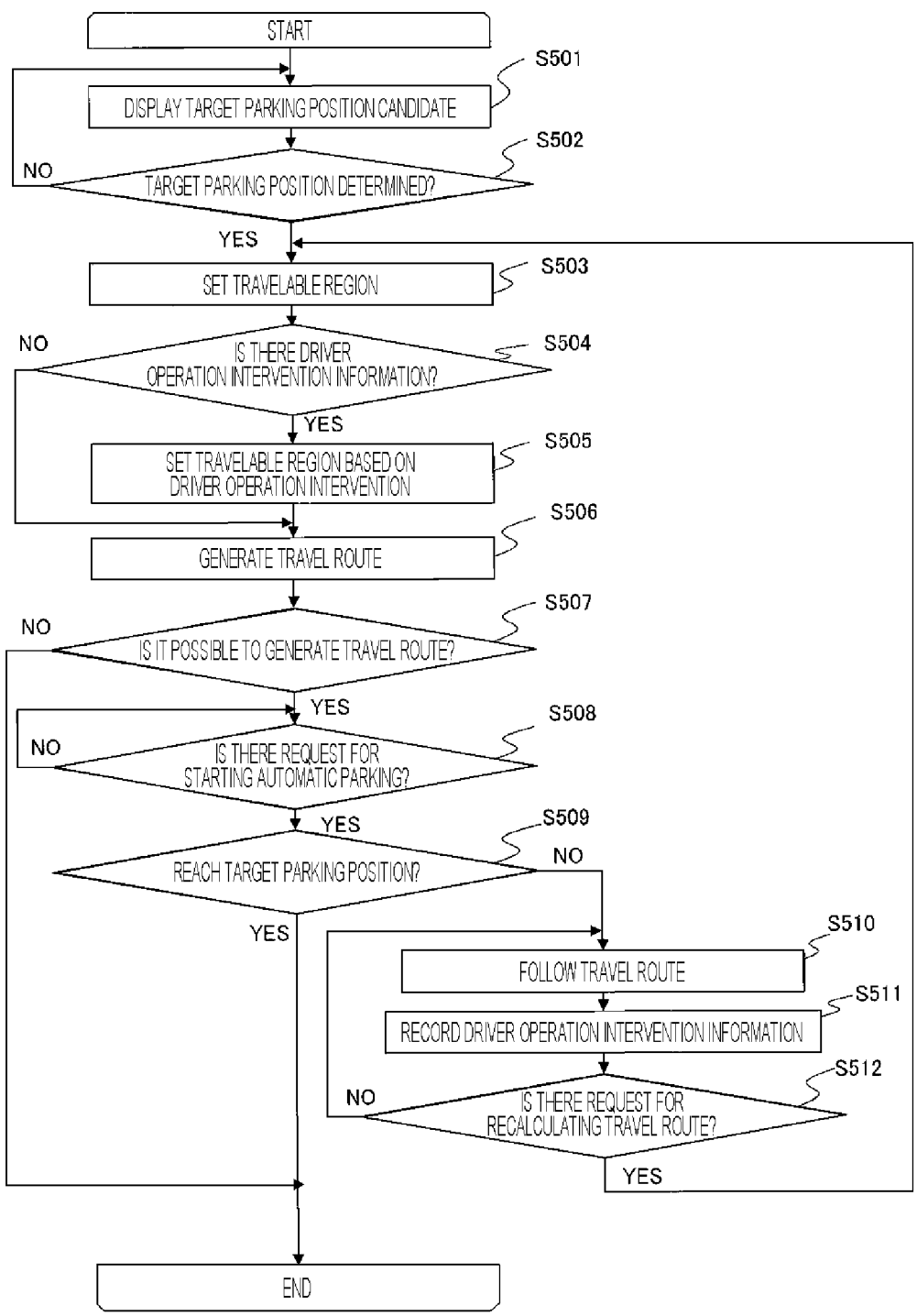
FIG. 3 is a flowchart showing Example 1 of the present invention and showing an example of processing performed by the vehicle control device.

Next, the route generation unit 403 returns the process to step 506 of FIG. 3 when the process of FIG. 6 is completed.

In step S506, the route generation unit 403 calculates a travel route from the current position of the vehicle to the target parking position based on the target parking position and the travelable region 104. A specific calculation method of the travel route will be described with reference to FIGS. 7 to 9.

Figure 7:
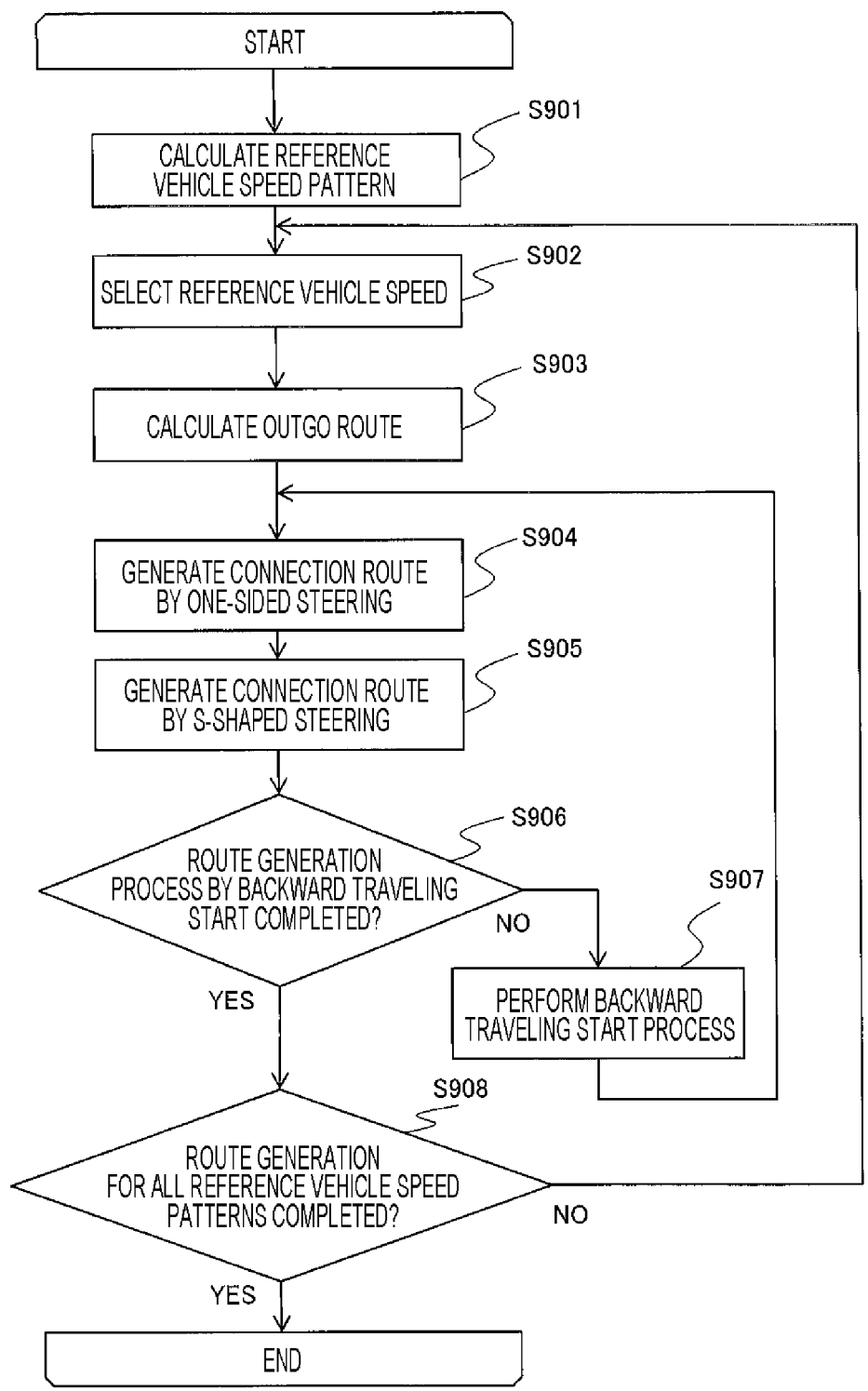
FIG. 7 is a flowchart showing Example 1 of the present invention and showing an example of a travel route generation process.

FIG. 7 is a flowchart showing an example of the travel route generation process. This process is performed in step S506 of FIG. 3.

In step S901, the route generation unit 403 calculates the reference vehicle speed pattern Vbase when the vehicle 300 travels on the travel route. Specifically, when the vehicle speed is decreased at a predetermined interval Vd based on the upper limit vehicle speed Vmax for the parking space to reach the minimum vehicle speed Vmin, the reference vehicle speed pattern Vbase is generated as shown in the following equation (1).

[Math. 1]

$$V_{base} = [V_{max}, V_{max} - V_d, \ldots V_{min}] \quad (1)$$

The upper limit vehicle speed Vmax and the lower limit vehicle speed Vmin are preset values. Here, the route generation unit 403 sets the upper limit vehicle speed Vmax to be smaller as the passage width W is narrower and the distance between the obstacle and the vehicle position is closer. As a result, the vehicle speed can be lowered when the passage is narrow or the distance to the obstacle is short, and the driver's discomfort can be alleviated.

In addition, the route generation unit 403 sets the upper limit vehicle speed Vmax to the value of backward traveling smaller than that of forward traveling, so that it is possible to reduce the vehicle speed when traveling backward, which is difficult for the driver to check, and it is possible to alleviate the discomfort of the driver.

Further, the route generation unit 403 sets the reference vehicle speed to be smaller as the curvature is larger because the lateral acceleration is larger as the vehicle speed is higher even when the curvature is the same. As a result, the driver is not subjected to excessive lateral acceleration, and the drivability is improved.

In addition, the route generation unit 403 reduces the vehicle speed in an environment in which it is difficult for the driver to visually recognize the surrounding states of the vehicle. Specifically, the route generation unit 403 sets the vehicle speed low based on the sensor information acquired by the illuminance sensor (not shown) and the surrounding state recognition sensor 325 when a situation in which the illuminance of the surrounding environment is dark is detected, or when raindrops are detected by the wiper signal or the surrounding state recognition sensor 325. By lowering the vehicle speed in a situation where it is difficult for the driver to recognize the surrounding states, it is possible to suppress the driver's discomfort.

In step S902, the route generation unit 403 selects, from the plurality of reference vehicle speed patterns calculated above, one reference vehicle speed for which the route generation process has not been completed to perform the following route generation process about the selected reference vehicle speed.

Figure 8:
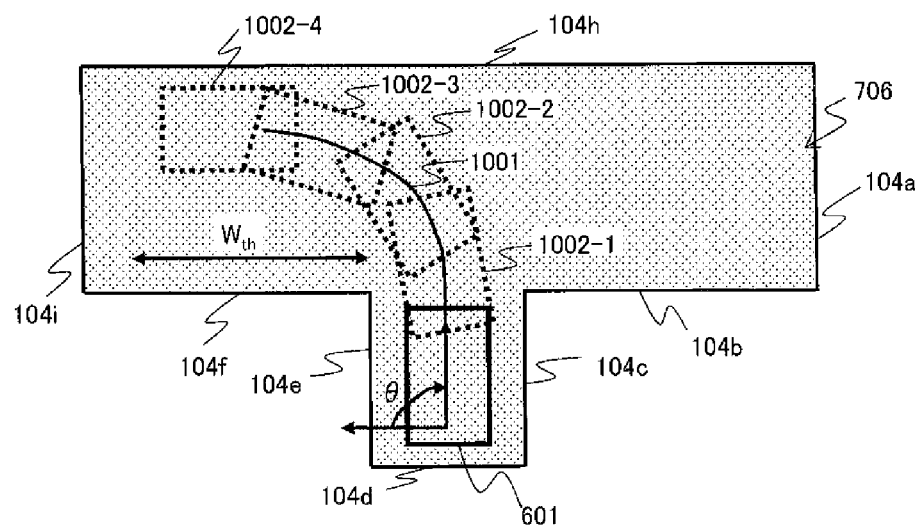
FIG. 8 is a plan view showing Example 1 of the present invention and showing an example of the result of an outgo route calculation.

In step S903, as shown in FIG. 8, the route generation unit 403 calculates a travel route 1001 in which the vehicle can outgo without contacting the obstacle 102 in the travelable region 706 based on the driver operation intervention information 450 from the state where the vehicle 300 is disposed in the target parking frame 601. In addition, in FIG. 8, the positions 1002-1 to 1002-4 of the vehicle on the travel route 1001 are shown.

Here, in order to shorten the total length of the travel route 1001 it is desirable that the route generation unit 403 sequentially calculates the outgo route based on the minimum turning radius when turning, but the outgo route may be calculated by increasing the radius at the time of turning.

Further, the wider the passage width, the larger the radius when turning the route generation unit 403 may set. As a result, when the parking space is wide, the turning is gentle and the drivability is improved. As for the outgo route, the route generation unit 403 calculates the outgo route until a predetermined end condition is satisfied. The outgo route is a route opposite to the travel route at the time of parking.

The predetermined end condition includes, for example, a plurality of conditions, such as a condition under which the vehicle body center line of the vehicle 300 is perpendicular to the parking direction and it is parallel to the direction of the passage, and a condition of reaching a point away from the target parking position by a predetermined distance Wth. The route generation unit 403 performs the outgo route calculation until at least one of the plurality of end conditions is satisfied.

In step S904, the route generation unit 403 generates a connection route by the one-sided steering. The route generation unit 403 determines whether it is possible to be connected to the position 1002 (see FIG. 8) calculated in the outgo route from the current vehicle position by the one-sided steering to store the route information when the connection is possible.

Here, the route generation unit 403 does not determine whether it is possible to be connected with respect to all of the positions 1002-1 to 1002-4 calculated in the outgo route, but determines the connection with respect to the position 1002-3 where the angle of the vehicle 300 (center line of the vehicle body) is larger than the angle of the vehicle 300 (center line of the vehicle body) at the automatic parking start position 701 (FIG. 5A).

This makes it possible to generate a route that does not give the driver a sense of discomfort. Here, the one-sided steering indicates an operation of turning the steering wheel of the vehicle 300 to only one of the left and right sides.

Figure 9:
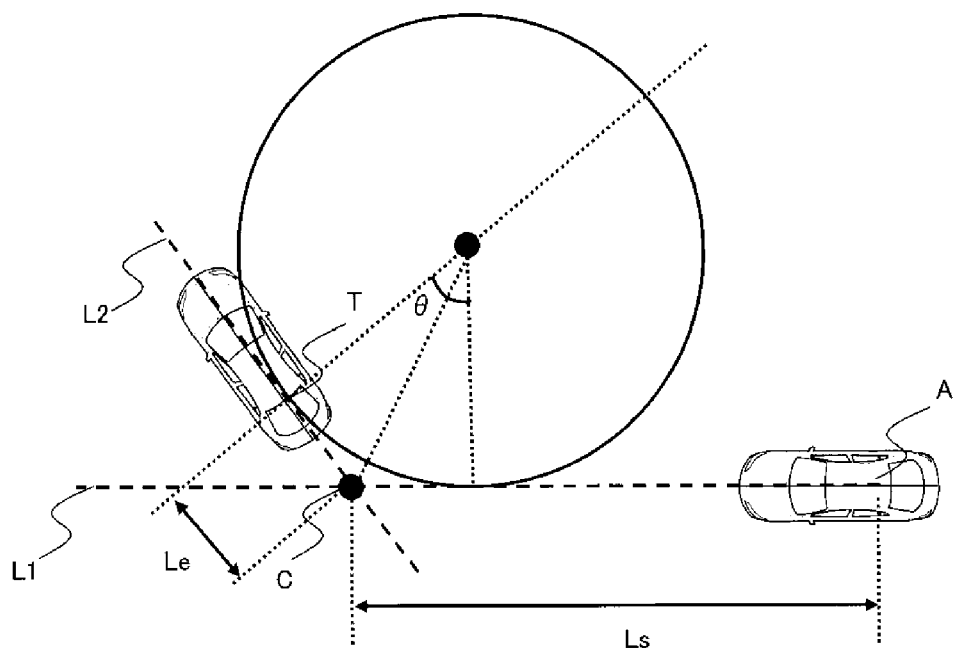
FIG. 9 is a plan view showing Example 1 of the present invention and showing an example of a connection route by the one-sided steering.

FIG. 9 is a plan view showing an example of connection by the one-sided steering. In order to generate a travel route by the one-sided steering from the current position A to the arrival target position T, as shown in FIG. 9, the route generation unit 403 calculates the distance Ls between the intersection C of the axis line L1 and the axis line L2 and the automatic parking start position A, and the distance Le between the intersection C and the arrival target position T.

The route generation unit 403 selects the shorter distance (in the example shown in FIG. 9, the distance Le is selected). Then, the route generation unit 403 draws an arc having two axis lines L1 and L2 as a common tangent line, and passing through a position away from the intersection C by the shorter distance. The radius R of the circle at this time is calculated by the following formula (2).

[Math 2]

$$R = \frac{L_e}{\tan\frac{\theta}{2}} \quad (2)$$

As described above, the route generation unit 403 can generate a route from the automatic parking start position A to the arrival target position T by combining the straight line and the arc. Here, the connection by the one-sided steering is not limited to be made with a straight line and an arc, and a route may be generated using a relaxation curve such as a clothoid.

The route generation unit 403 connects the travel route (S903) calculated by the calculation of the outgo route and the route calculated when generating the connection route by the one-sided steering (S904) to store the route as a travel route.

In step S905, the route generation unit 403 generates a connection route by the S-shaped steering. The route generation unit 403 determines whether the automatic parking start position A can be connected to the position 1002 (FIG. 8) calculated by the above-mentioned outgo route by the S-shaped steering to store the route information as a travel route when connectable.

Here, as in the case of determining the connection by the one-sided steering, the route generation unit 403 does not determine whether it is possible to be connected with respect to all of the positions 1002-1 to 1002-4 (FIG. 8) calculated in the outgo route, but determines the connection with respect to the positions 1002-1 to 1002-3 where the angle of the vehicle 300 is larger than the angle of the vehicle 300 at the automatic parking start position A. As a result, the route generation unit 403 can generate a travel route that does not give the driver a sense of discomfort.

Figure 10:
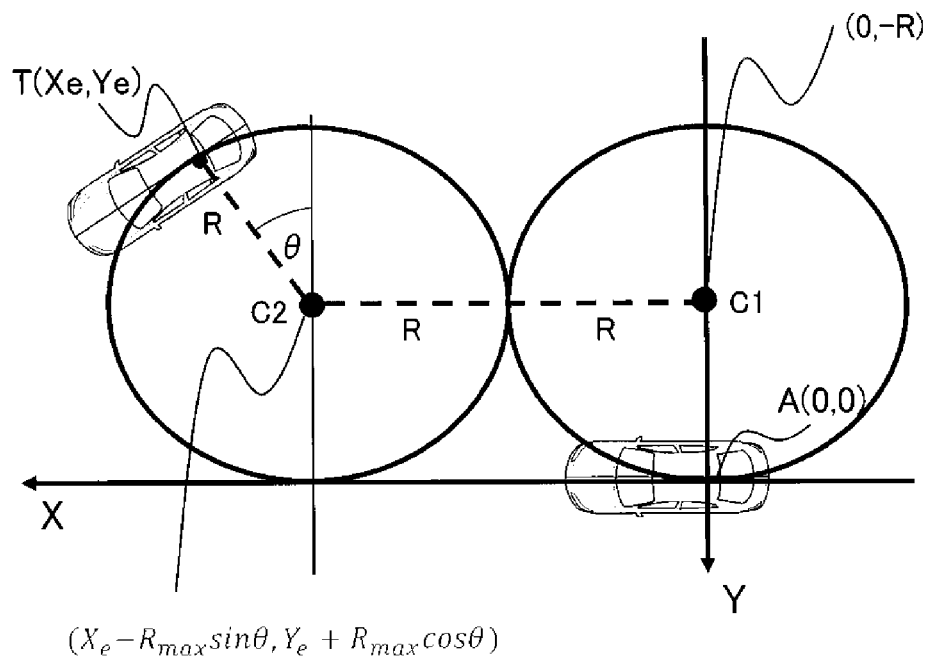
FIG. 10 is a plan view showing Example 1 of the present invention and showing an example of a connection route by the S-shaped steering.

In order to for the route generation unit 403 to generate a route by the S-shaped steering from the automatic parking start position A to the arrival target position T, the route generation unit 403 calculates the radius R for drawing an S shape as shown in FIG. 10.

Here, the route generation unit 403 can facilitate the calculation by setting the turning radius of the S-shaped steering to the same radius R, but may generate a connection route by the S-shaped steering using different radii.

When the route generation unit 403 makes different radii, the degree of freedom of the route by the S-shaped steering is increased, and it is easier to reach the arrival target position T. In the following, an example of the S-shaped steering using the same radius R will be described.

In FIG. 10, since the center coordinates C1 and C2 of each circle are calculated, the radius of the common circle is calculated by the equations (3) and (4) from the distance between the center coordinates.

$$2R = \sqrt{(X_e - R\sin\theta)^2 + (Y_e + R\cos\theta + R)^2} \quad (3)$$

$$R = \frac{\sqrt{\{X_e\sin\theta - Y_e(1 + \cos\theta)\}^2 - 2(\cos\theta - 1)(X_e^2 + Y_e^2)}}{2(\cos\theta - 1)} \quad (4)$$

The route generation unit 403 uses the calculated turning radius R to generate a connection route by the S-shaped steering. Here, the connection by the S shape is not limited to made with the arc, and the route generation unit 403 may generate the route by using a relaxation curve such as a clothoid. In this way, by generating the connection route using not only the one-sided steering but also the S-shaped steering, the degree of freedom of the travel route is increased and the connection route can be easily generated.

In step S906, the route generation unit 403 determines the end of the route generation process by the backward traveling start. The route generation unit 403 advances the process to step S907 when the route generation process by the backward traveling start has not been performed, and advances the process to step S908 when the generation process by the backward traveling start has already been completed.

The backward traveling start process in step S907 will be described with reference to FIG. 11. When the automatic parking start position 701 passes the target parking frame 601, it is difficult to be connected to the route 1001 in which the vehicle can outgo by the one-sided steering and the S-shaped steering.

Figure 11:
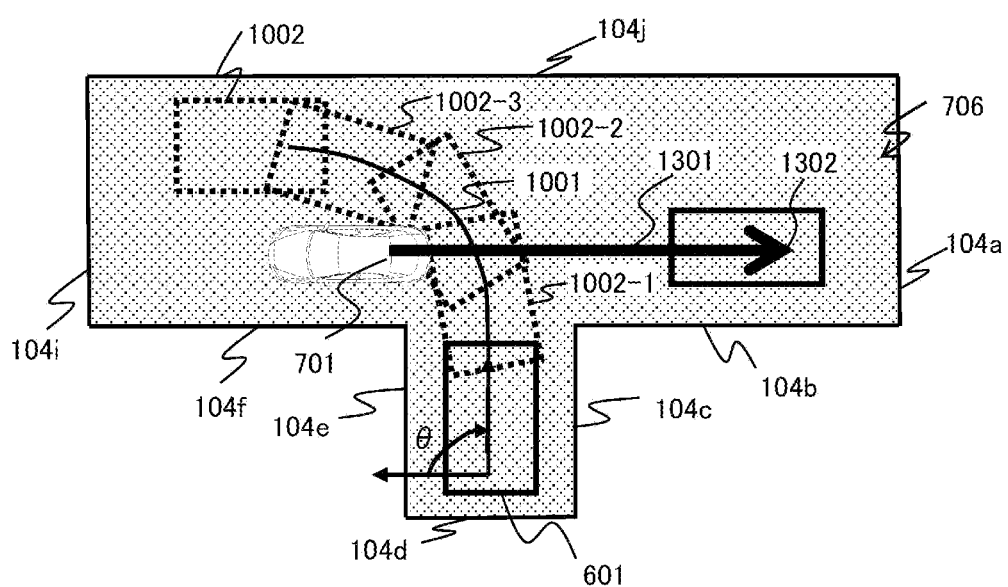
FIG. 11 is a plan view showing Example 1 of the present invention and showing an example of a backward traveling start process.

Therefore, as shown in the backward route 1301 of FIG. 11, the route generation unit 403 searches for a connection route to the route 1001 in which the vehicle can outgo from a vehicle position 1302 when the vehicle moves backward by a predetermined amount. As a result, the travel route is compact, and the discomfort to the driver can be reduced.

Further, the route generation unit 403 adjusts the vehicle angle when moving backward so that the automatic parking start position 701 is parallel to the passage when it is not parallel. As a result, the route generation unit 403 can easily succeed in searching for a connection route to the vehicle position 1002 on the route in which the vehicle can outgo at the next advance.

After moving the vehicle position 1302 by the backward traveling start process (S907), the route generation unit 403 performs generation of the connection route by the one-sided steering (S904) and generation of the connection route by S shape (S905), and stores them in the route information when the travel route is successfully generated.

In step S908, the route generation unit 403 determines whether generation of travel routes based on all the reference vehicle speed patterns has been completed. The route generation unit 403 generates a travel route by the forward traveling and backward traveling start for each reference vehicle speed pattern, and then completes generation of the candidates for the travel route.

Next, the process returns to the flowchart of FIG. 3 and the following process is performed.

In step S507, when the travel route can be generated in step S506, the process proceeds to step S508, and when the route generation unit 403 cannot generate the automatic parking travel route, the process ends.

In step S508, the vehicle control device 324 determines whether the driver has instructed the start of automatic parking via the input/output device 327. When the vehicle control device 324 receives the request for starting automatic parking, the process proceeds to step S509. Here, the request for starting automatic parking is not limited to be made through the input by the driver, but also includes the request made via communication from the outside of the vehicle 300 such as control.

In step S509, the vehicle control device 324 travels following the travel route and determines whether the vehicle 300 has reached the target parking position T. When the vehicle position moves to the target parking position T, the vehicle control device 324 ends the process, and when the vehicle position does not move to the target parking position T, the travel route follow-up travel of step S510 is performed.

In step S510, the vehicle is controlled so as to follow the generated travel route. Specifically, the steering is controlled based on the curvature information with respect to the movement distance from the automatic parking start position 701, and the driving force is controlled based on the speed information with respect to the movement distance from the automatic parking start position 701. Further, at the turning position, when it is necessary to switch the shift or to steer without driving (steering while the vehicle is stopped), the steering and the switching of the traveling direction are controlled.

In step S511, the vehicle control device 324 records the driving operation information when the driver intervenes in the driving operation during the execution of automatic parking. Specifically, the vehicle control device 324 records as the operation history the position and the angle of the vehicle 300 at which the driver's operation (shift switching operation, accelerator operation, brake operation) occurs, the distance between the vehicle endpoint and the obstacle, and the like in the driver operation intervention information 450.

In step S512, the vehicle control device 324 determines whether a situation has occurred in which the travel route is recalculated during automatic parking. When recalculating the travel route, the vehicle control device 324 advances the process to step S503, sets the travelable region 104, and recalculates the travel route.

Here, the situation in which the travel route is recalculated includes a situation when the position of the obstacle 102 detected at the start of automatic parking changes significantly, a situation when a change in the turning position is required by a shift operation or a brake operation by the driver.

The former occurs when automatic parking is started with poor distance accuracy when the position of the obstacle 102 detected at the start of automatic parking is far, and the distance is closer than that at the position detected at the start of automatic parking when approaching the obstacle 102. At this time, since the target parking position cannot be reached by using the travel route at the start of automatic parking, it is necessary to recalculate the travel route. The same applies to the latter, and when the turning position is changed, the target parking position cannot be reached by the route at the start of parking, so it is necessary to recalculate the route.

As mentioned above, according to Example 1, when the intervention by the driver in the driving operation occurs during automatic parking, the operation history is recorded in the driver operation intervention information 450, and the travelable region 706 can be reset based on the operation history.

The vehicle control device 324 changes a travelable region from the travelable region 104 set according to the surrounding environment to the travelable region 706 allowed by the driver to recalculate the travel route, so that it is possible to provide automatic parking that is comfortable to the driver. As a result, it is possible to reduce the intervention in the automatic parking by the driving operation by the driver, and to improve the safety and operability of the automatic parking.

The vehicle control device 324 moves the outer circumference (line segment) of the travelable region 104 in the direction of reducing the travelable region 104 on the extension of the traveling direction at the position 707 at which the intervention by the driver in the driving operation occurs during automatic parking to reset the travelable region 706 again. In Example 1, the route generation unit 403 moves the outer circumference (line segments 104*a* to 104*j*) of the travelable region 706 to a position which corresponds to a predetermined distance r from the vehicle endpoint 704, so that the reduced travelable region 706 can be reset. In Example 1, the route generation unit 403 moves the outer circumference (line segment) of the travelable region 706 to a position circumscribing a circle having a radius r around the vehicle endpoint 704 to, so that the region is reduced.

In Example 1, the vehicle control device 324 starts traveling when the automatic parking command is received from the input/output device 327, but the present invention is not limited to this. For example, the vehicle control device 324 is connected to the mobile terminal via radio communication, and the mobile terminal can transmit a command for starting automatic parking or intervening a driving operation.

Although Example 1 shows an example in which the periphery (boundary) of the travelable regions 104 and 706 is composed of a line segment, a curved line may be used.

Example 2

Figure 12:
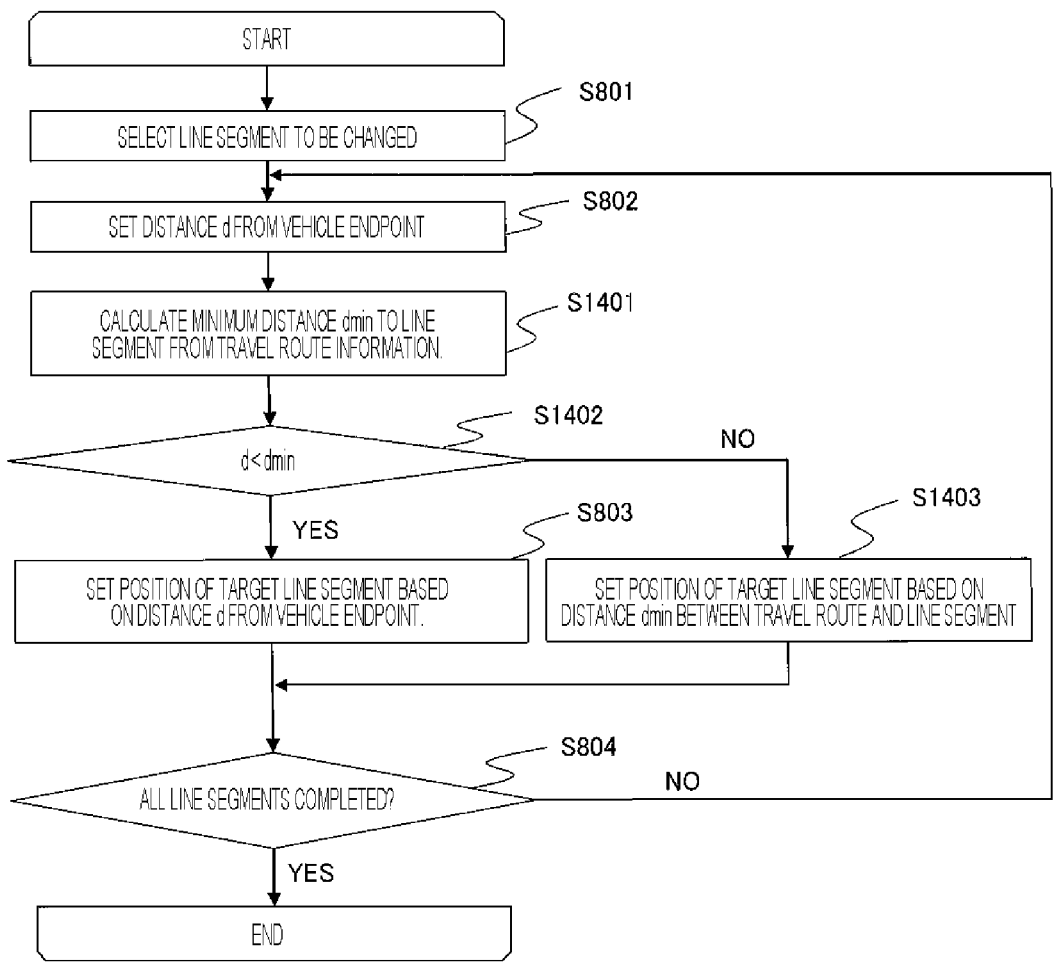
FIG. 12 is a flowchart showing Example 2 of the present invention and showing an example of a setting process of a travelable region based on driver operation intervention information.
Figure 13:
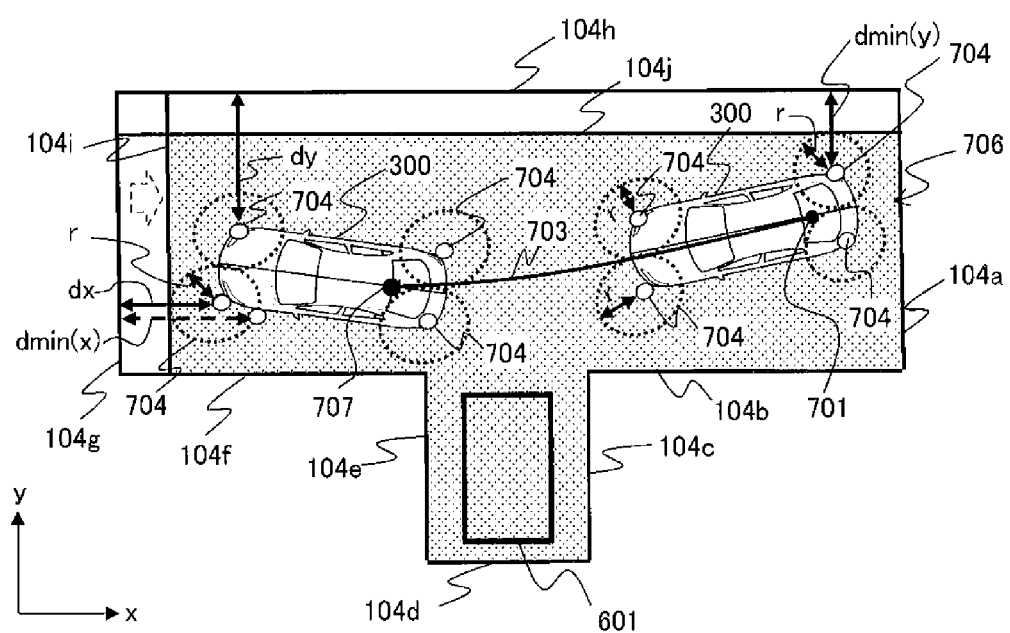
FIG. 13 is a plan view showing Example 2 of the present invention and showing an example of a set travel route.

Example 2 shows an example of the setting process of the travelable region 706 based on the driver operation intervention information 450 in step 505 shown in Example 1. FIG. 12 is a flowchart showing an example of the travelable region setting process based on the driver operation intervention information. This process is performed in place of FIG. 6 of Example 1. FIG. 13 is a plan view showing an example of the set travel route. The other configurations are the same as those in Example 1.

In FIG. 12, in step S801, as in Example 1, the route generation unit 403 selects the line segment of the travelable region 104 to be changed based on the position and the angle of the vehicle 300 at which the intervention by the driver in the driving operation occurs, and the traveling direction before the driver intervenes in the operation.

In step S802, the route generation unit 403 sets a predetermined distance r (radius r) from each vehicle endpoint 704 as in Example 1.

In step S1401, the route generation unit 403 calculates the distances dx(n) and dy(n) to each line segment at predetermined distance intervals (for example, every 0.5 m movement) during automatic parking to record them while sequentially updating the distances dmin(x) (n) and dmin(y) (n) each of which is a distance when the distance to each line segments is minimum. Here, n represents the number of line segments. In the following, (n) for each predetermined distance interval will be omitted.

In addition, dx and dy represent the distances from the vehicle endpoint 704 to the line segment in the x-axis direction and the y-axis direction in the figure, respectively. The distances dmin(x) (n) and dmin(y) (n) represent the minimum distances from the vehicle endpoint 704 to the line segment in the x-axis direction and the y-axis direction in the figure, respectively.

In step S1402, the route generation unit 403 compares the distances dx and dy to each line segment at the position 707 of the vehicle 300 at which the driver intervenes in the driving operation with the distances dmin(x) and dmin(y) each of which is a distance when the distance to the line segment is minimum between the automatic parking start position 701 and the position of the vehicle 300 at which the driver intervenes in the driving operation, and the process proceed to step S803 when the distance d (indicating dx or dy) is smaller than the distance dmin (indicating dmin(x) or dmin(y)), and the process proceeds to step S1403 when the distance dmin is smaller than the distance d.

Here, as an example, as shown in FIG. 13, the situation where the minimum distance dmin(y) on the travel route 703 is smaller than the distance dy at the time of intervention with respect to the line segment 104h is a situation where parking starts when the automatic parking start position 701 is close to the line segment 104h, and the driver intervenes in the driving operation at the position 707 toward the parking frame 601.

When the route generation unit 403 sets the travelable region 706 using only the position information when the driver intervenes in the driving operation, it sets the travelable region 706 without consideration to small, resulting in the increased number of turns, and at the worst case, the travel route cannot be generated.

Therefore, when comparing the distance dy to the line segment 104h at the position at which the driver intervenes in the driving operation with the distance dmin(y) which is a distance when the distance to the line segment 104h is minimum on the travel route 703, the minimum distance dmin(y) is smaller than the distance dy at the time of intervention. Since the minimum distance dmin(y) is on the travel route 703 that the vehicle has already passed, it can be an acceptable distance for the driver.

On the other hand, when comparing the distance dx to the line segment 104g at the position at which the driver intervenes in the driving operation with the distance dmin(x) which is a distance when the distance to the line segment 104g is minimum on the travel route 703, the distance dx is smaller than the minimum distance dmin(x) on the travel route 703. Therefore, the distance dx at the position 707 at which the driver intervenes in the driving operation can be set as the driver's acceptable distance.

As in Example 2, by utilizing the traveling history information 460 (distance d, dmin) while traveling by automatic parking, it is possible to solve the above problems, and it is possible to set the travelable region 706 more correctly.

In step S803, the line segment 104g having a distance dx satisfying d<dmin is the target of change, and the route generation unit 403 changes the position of the target line segment. That is, the route generation unit 403 moves the line segment 104g calculated in step S801 until it circumscribes the distance r (circle with radius r) calculated in step S802. As a result, a new line segment 104i is set. This makes it possible to set the new travelable region 706 that reflects the intervention by the driver in the driving operation.

On the other hand, in step S1403, since d dmin, the position of the line segment is set based on the value dmin(y) which is a distance when the distance to each line segment is minimum on the travel route 703 by automatic parking. As an example, as shown in FIG. 13, the line segment 104h is moved to the position of radius r from the vehicle endpoint 704 and changed to a new line segment 104j, so that the travelable region 706 is set by the new line segments 104j and 104i.

In step S804, the route generation unit 403 determines whether a change in the position of the line segment selected in step S801 is completed. The route generation unit 403 ends the flowchart when the above process is completed for all the selected line segments, and returns the process to step S802 to repeat the above process when the above process is not completed.

As mentioned above, according to Example 2, since the distance to the reset line segment (outer circumference of the travelable region) is larger than the minimum distance dmin of the distance from the position on the travel route 703 that the vehicle has already passed to the line segment (outer circumference of the travelable region) using the traveling history information 460 during travel from the position at which the driver intervenes in the driving operation to the automatic parking start position 701, the route generation unit 403 prohibits resetting.

As a result, since the position on the travel route that the vehicle has already passed holds the distance d (dx or dy) allowed by the driver, by suppressing the extension of the new distance d beyond the minimum distance dmin allowed by the driver, it is possible to prohibit the travelable region 706 from being reduced more than necessary.

While the route generation unit 403 moves the outer circumference (line segment 104g) of the travelable region according to the driving operation by the driver to set the outer circumference (line segment 104i) of the new travelable region 706, it prevents the travelable region 706 from being inadvertently reduced (movement to the dy side), so that it is possible to secure the degree of freedom in setting the new travel route 703.

Example 3

Figure 14:
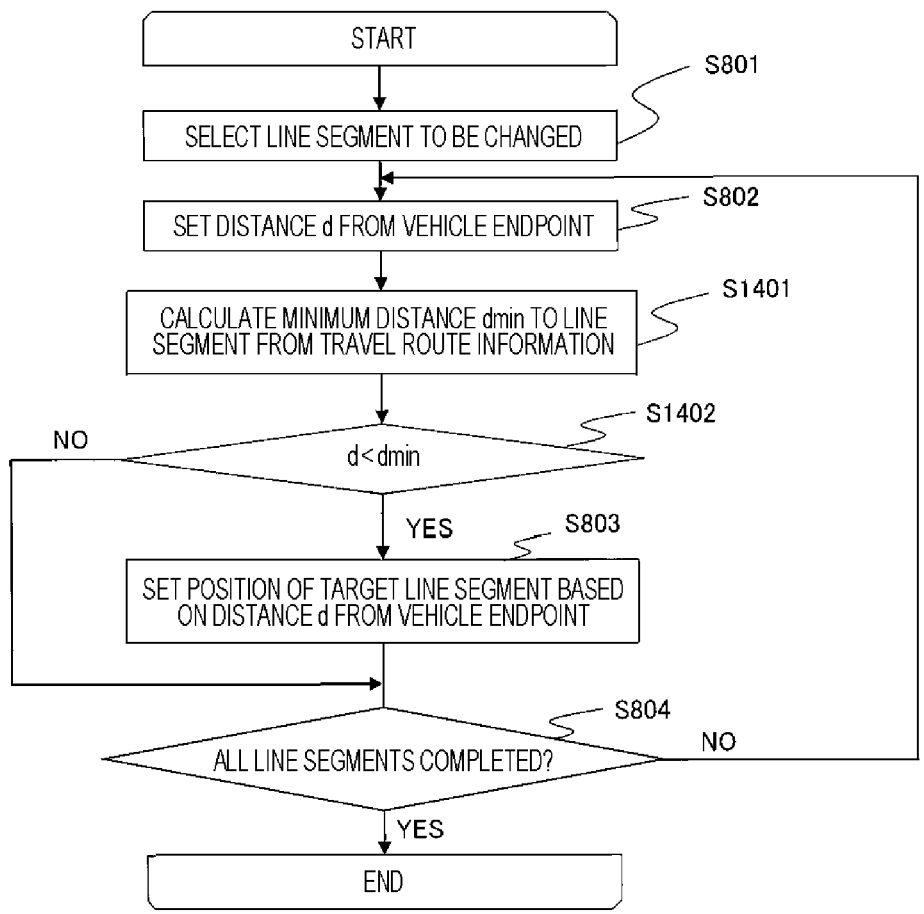
FIG. 14 is a flowchart showing Example 3 of the present invention and showing an example of a setting process of a travel route based on driver operation intervention information.
Figure 15:
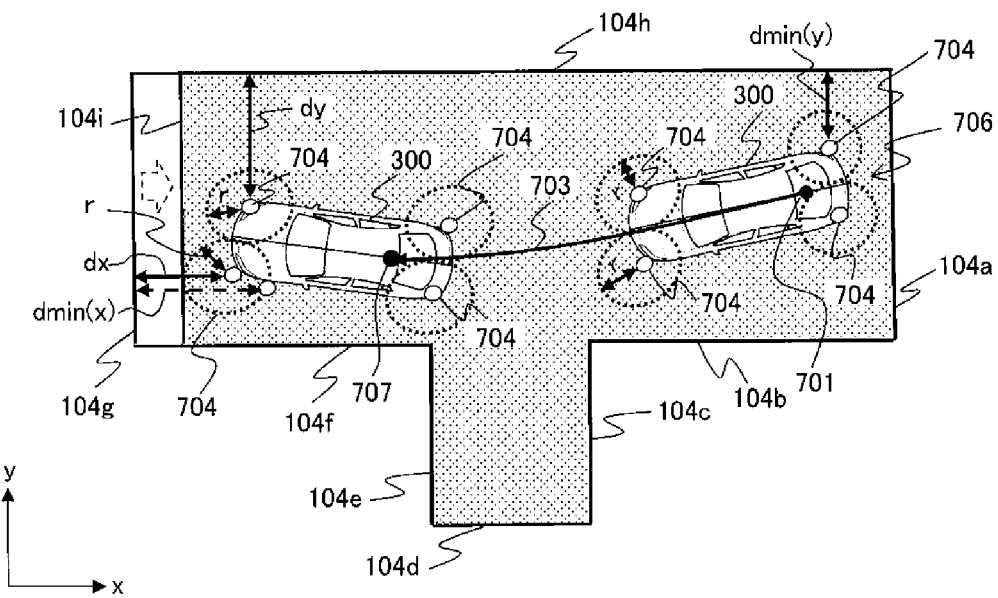
FIG. 15 is a plan view showing Example 3 of the present invention and showing an example of a travelable region based on set driver operation intervention information.

Example 3 shows an example of the setting process of the travelable region 706 based on the driver operation intervention information 450 in step 505 shown in Example 1. FIG. 14 is a flowchart showing an example of the travelable region setting process based on the driver operation intervention information. This process is performed in place of FIG. 6 of Example 1. FIG. 15 is a plan view showing an example of the set travel route. The process of steps S801 to S804 is the same as that of FIG. 6 of Example 1. The other configurations are the same as those in Example 1.

As described in Example 2, the route generation unit 403 may determine whether to permit the resetting of the travelable region 706 based on the driver operation intervention information 450 based on comparison of vehicle state information of the traveling history information 460 during automatic parking. In other words, the route generation unit 403 changes the position only for the line segment satisfying a predetermined condition among the line segments of the travelable region 706.

Specifically, the route generation unit 403 calculates the distances dx(n) and dy(n) to each line segment at predetermined distance intervals (for example, every 0.5 m movement) during automatic parking to record them while sequentially updating the distances dmin(x) (n) and dmin(y) (n) each of which is a distance when the distance to each line segments is minimum as in Example 2 (S1401). Here, n represents the number of line segments. In the following, (n) for each predetermined distance interval will be omitted. In addition, dx, dy, dmin(x), and dmin(y) represent the distances from the vehicle endpoint 704 to the line segments in the x-axis direction and the y-axis direction in the figure, respectively.

The route generation unit 403 compares the distances dx and dy at the vehicle position 707 of the vehicle 300 at which the intervention by the driver in the driving operation occurs with the distances dmin(x) and dmin(y) which is a distance when the distance to the line segment is minimum on the travel route 703 from the automatic parking start position 701 to the position 707 of the vehicle 300 at which the intervention by the driver in the driving operation occurs (S1402). When the distances dx and dy are smaller, the route generation unit 403 permits travelable region setting based on driver operation intervention information 450 (S803), and when the distances dmin(x) and dmin(y) are smaller, it prohibits the resetting of the travelable region 706 based on the driver operation intervention information 450.

In step S804, the route generation unit 403 ends the flowchart when the above process is completed for all the line segments selected in step S801, and returns the process to step S802 to repeat the above process when the above process is not completed.

As an example, as shown in FIG. 15, the route generation unit 403 changes the line segment 104g satisfying the distance dx<the minimum distance dmin(x) to the line segment 104i in the direction in which the travelable region 706 is reduced. For the line segment 104h satisfying the distance dy>the minimum distance dmin(y), the position change is prohibited because the distance dy is larger than the distance dmin(y), and the line segment 104h is left as it is.

As a result, by utilizing the information while traveling by automatic parking, it is possible to prevent the travelable region 706 from being inadvertently restricted (reduced), and the travelable region 706 can be set appropriately.

Example 4

Figure 16:
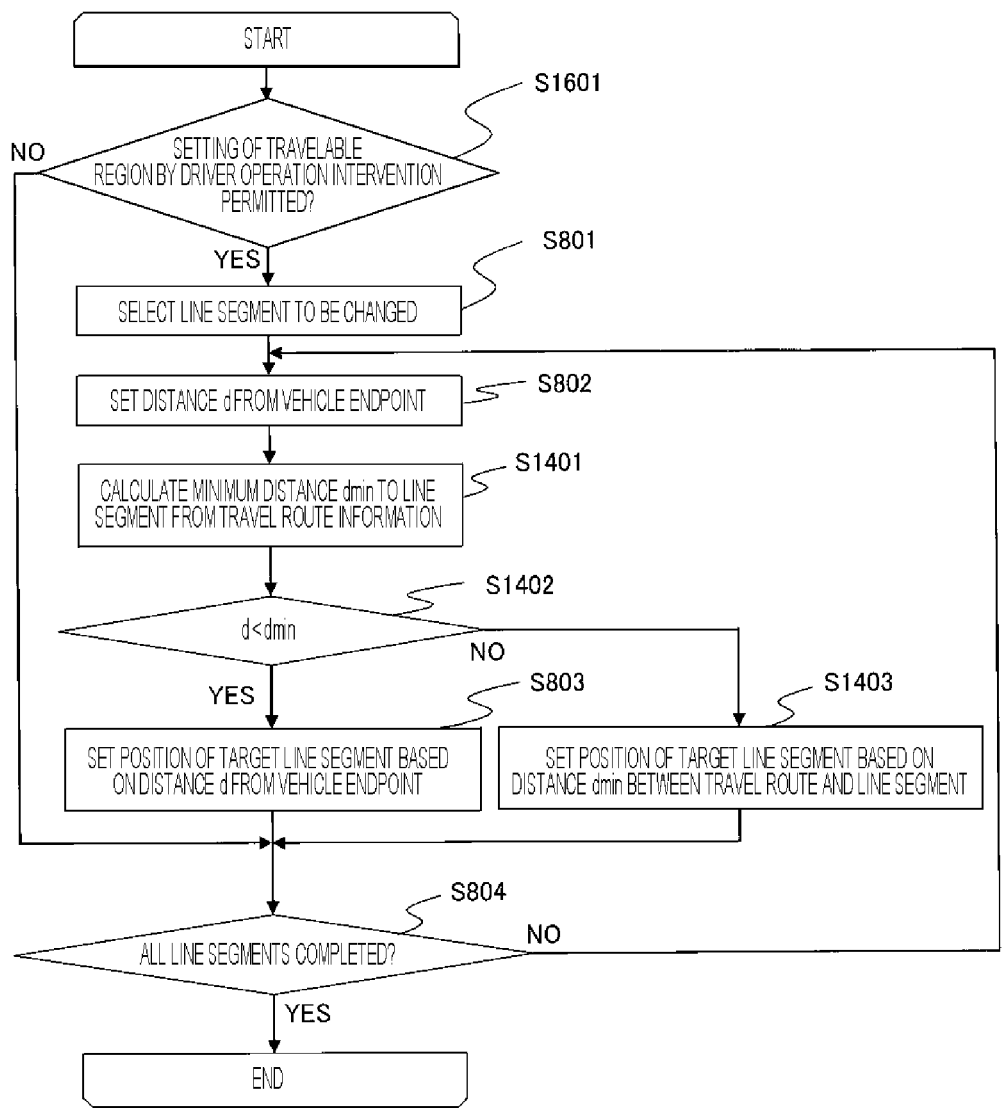
FIG. 16 is a flowchart showing Example 4 of the present invention and showing an example of a setting process of a travelable region based on driver operation intervention information.
Figure 17:
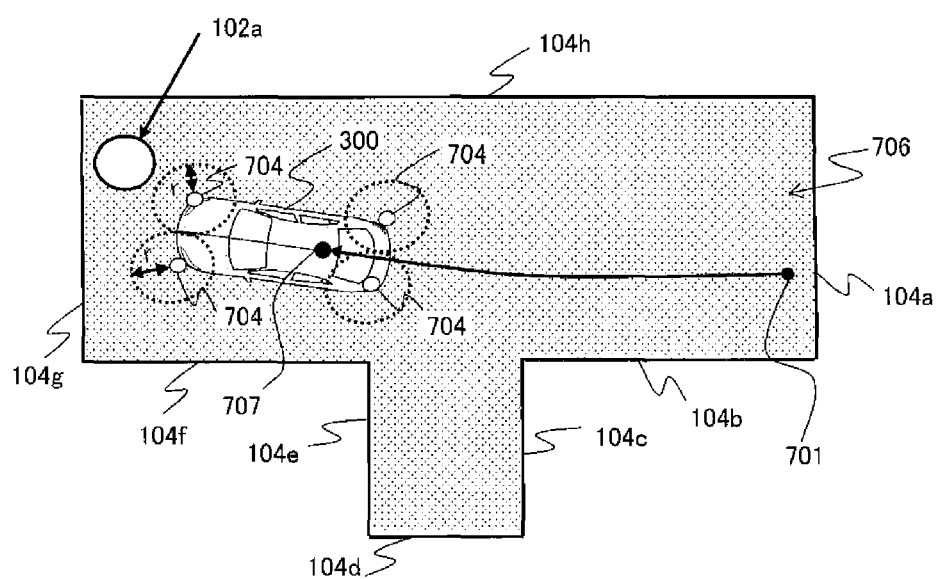
FIG. 17 is a plan view showing Example 4 of the present invention and showing an example of a set travel route.

Example 4 shows an example of the process of permitting the resetting of the travelable region 706 in response to a command from the driver in step 505 shown in Example 1. FIG. 16 is a flowchart showing an example of a travelable region setting process based on a command from the driver. This process is performed in place of FIG. 6 of Example 1. FIG. 17 is a plan view showing an example of the set travel route. The other configurations are the same as those in Example 1.

In Example 4, as shown in FIG. 16, the route generation unit 403 receives a command for prohibiting resetting or permitting resetting from the driver via the input/output device 327 to determine whether to permit resetting of the travelable region 706 based on the command from the driver, and sets the travelable region 706 as in Examples 1 and 2 in case of permission. On the other hand, in the case of prohibition, the route generation unit 403 does not perform resetting the travelable region 706 based on the driver's command, and the process proceeds to the route generation process.

In FIG. 16, in step S1601, a command from the driver is received from the input/output device 327, and a permission determination for resetting the travelable region 706 is performed. Specifically, as shown in FIG. 17, in a case where prohibition of resetting is input by the driver's command when there is a movement obstacle 102a in front of the vehicle 300, the route generation unit 403 prohibits the setting of the travelable region.

This is because when the driver finds the movement obstacle 102a, since the final position of the movement obstacle 102a is indefinite, the travelable region 706 is inadvertently reduced when the movement obstacle 102a moves out of the travelable region 104 after the route generation unit 403 sets the travelable region 702 based on the information.

Since the processes after step S1601 are the same as those in FIG. 12 of Example 2, the description thereof will be omitted.

As a result, the route generation unit 403 can correctly set the travelable region.

Further, when the movement obstacle 102a is stopped and is a stationary object, the route generation unit 403 reflects it in the travelable region setting process (S503) based on the sensor information. After that, in a case where there is an operation history of the driver operation intervention information 450 when the vehicle 300 approaches the stationary obstacle, the route generation unit 403 sets the travelable region 706 based on the driver operation intervention information 450 (S505).

As mentioned above in Example 4, when a command from the driver is input due to the movement obstacle 102a and the like by prohibiting the setting of the travelable region 706, it is possible to prevent the travelable region 706 from being inadvertently reduced.

Example 5

Figure 18:
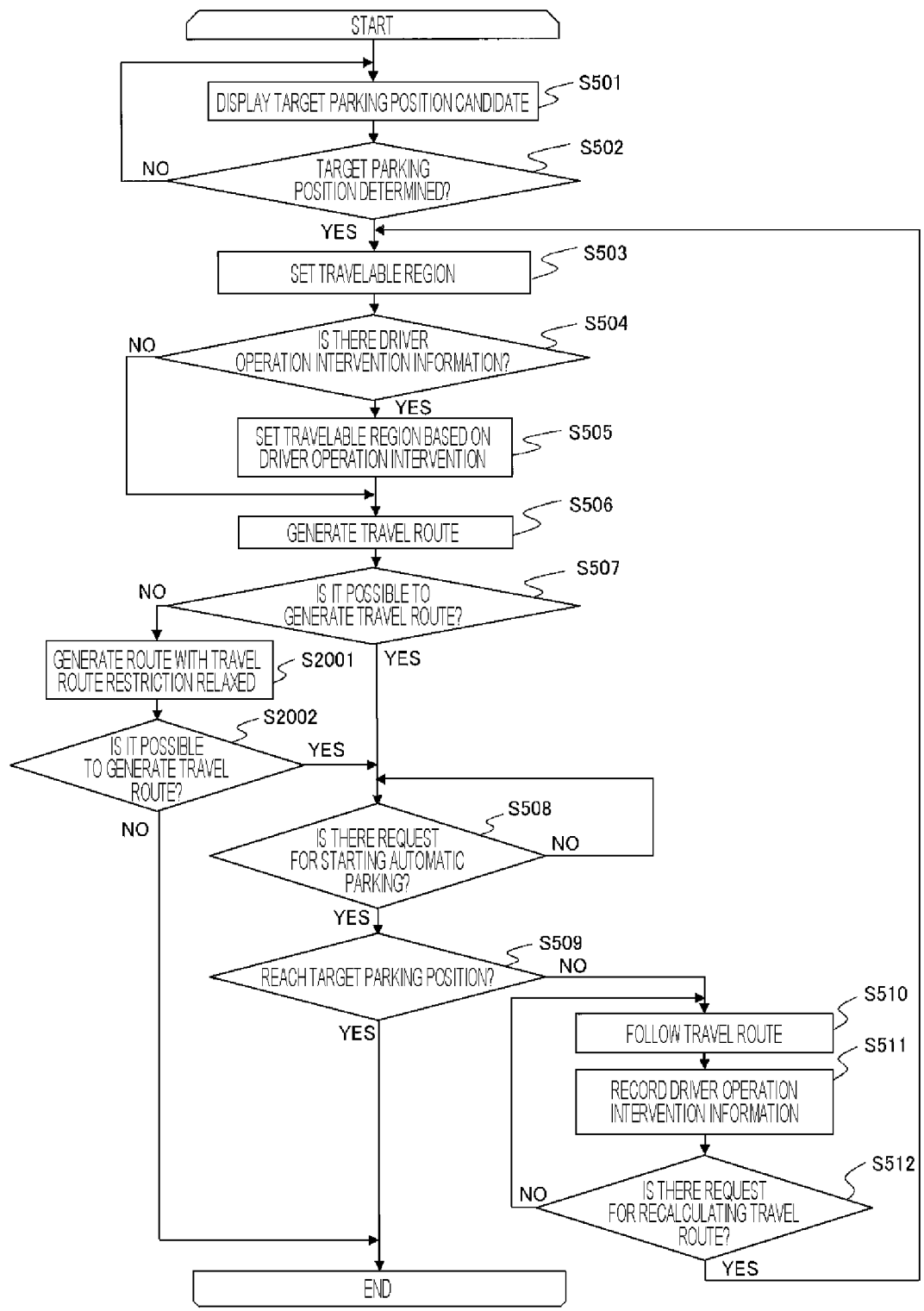
FIG. 18 is a flowchart showing Example 5 of the present invention and showing an example of processing performed by the vehicle control device.

FIG. 18 shows Example 5 and shows another example of the process of the vehicle control device 324 of FIG. 3 shown in Example 1. The other configurations are the same as those in Example 1.

In step S501, as in Example 1 above, the parking target candidate presentation unit 401 calculates the available parking space based on the parking frame information detected by the surrounding state recognition sensor 325 and the vacant space information without an obstacle. When the available parking space is calculated, the parking target candidate presentation unit 401 displays it on the input/output device 327 as a candidate for the target parking position. When the available parking space is not calculated, the parking target candidate presentation unit 401 ends the process.

In step S502, as in Example 1 above, when the parking target candidate presentation unit 401 accepts the target parking position, from among the candidates for the target parking position, selected by the driver via the input/output device 327, the process proceeds to step S503, and when not accepted, the process waits.

In step S503, as in Example 1 above, the route generation unit 403 sets the travelable region 104 based on the above-selected target parking position and position information 103 of an obstacle 102 (see FIG. 4A) acquired by the surrounding state recognition sensor 325.

In step S504, as in Example 1, the route generation unit 403 determines whether the driver operation history is stored in the driver operation intervention information 450. The route generation unit 403 advances the process to step S505 when the operation history is stored in the driver operation intervention information 450, and advances the process to step S506 when the driver operation intervention information 450 does not include the operation history.

In step S505, as in Example 1, the route generation unit 403 sets the travelable region based on the driver operation intervention information 450. The route generation unit 403 performs this process only when the operation history is recorded in the driver operation intervention information 450. When the operation history is not recorded in the driver operation intervention information 450, the route generation unit 403 sets the travelable region 104 based on the position information 103 of the obstacle 102 acquired by the surrounding state recognition sensor 325 calculated in step S503 above, and the process proceeds to step S506 in which a travel route is generated.

In step S506, as in Example 1, the route generation unit 403 calculates a travel route from the current position of the vehicle to the target parking position based on the target parking position and the travelable region 104.

In step S507, when the travel route can be generated in step S506, the process proceeds to step S508, and when the route generation unit 403 cannot generate the automatic parking travel route, the process proceeds to step S2001.

In step S2001, the route generation unit 403 performs the route generation in which the restriction on the travel route is relaxed, and then advances the process to step S2002. In step S2002, the route generation unit 403 advances the process to step S508 when the route can be generated, and ends this process when the route cannot be generated.

The generation of a route in which the travel route constraint is relaxed will be described with reference to FIGS. 19 and 20A to 20C.

Figure 19:
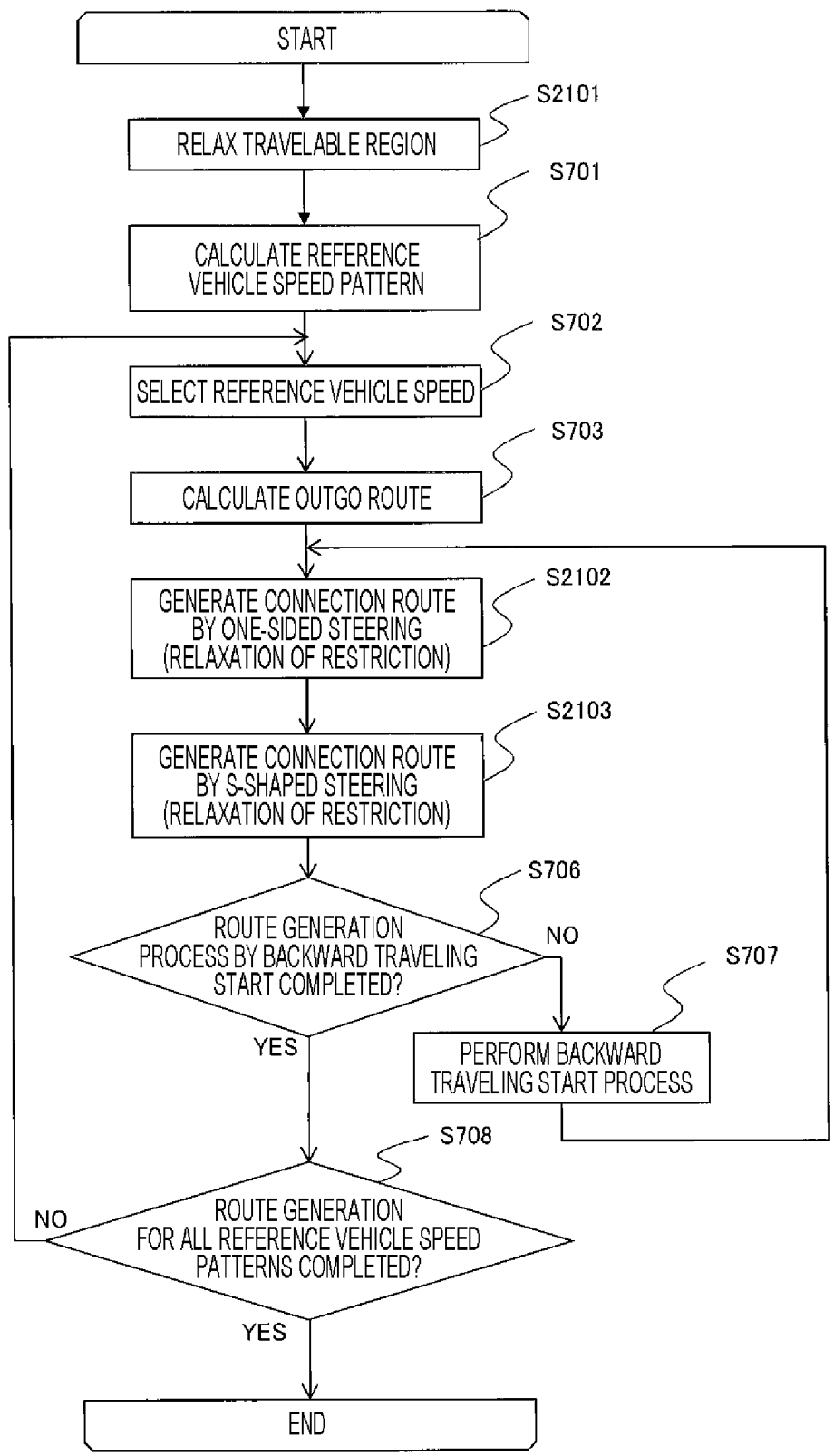
FIG. 19 is a flowchart showing Example 5 of the present invention and showing an example of a route generation process in which a restriction on travel route generation is relaxed.

FIG. 19 shows the processing order of travel route generation in which the restriction on the travel route is relaxed. This process is performed in step S2001.

Figure 20A:
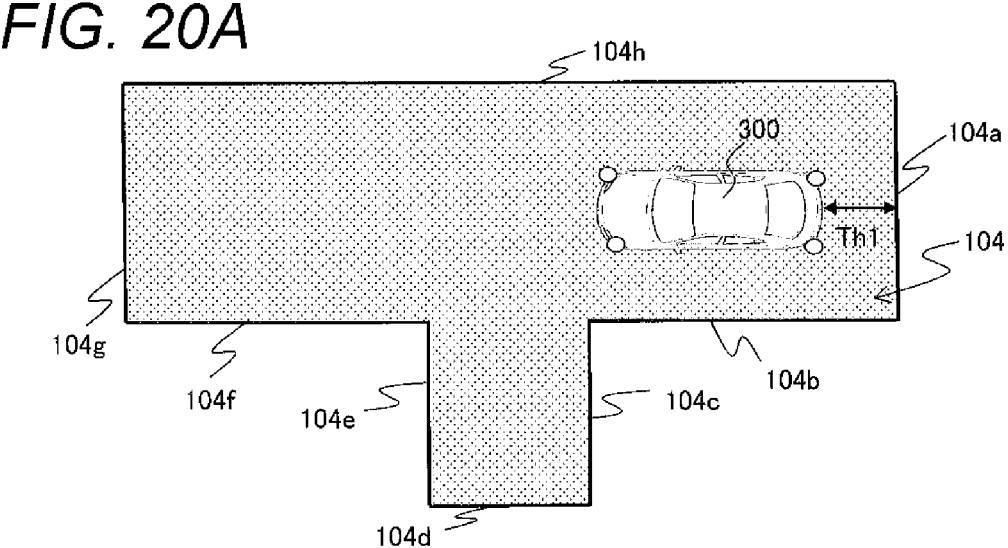
FIG. 20A is a plan view showing Example 5 of the present invention and showing an example of a set travelable region.

In step S2101, the route generation unit 403 relaxes the restriction of the travelable region 104 (706). Specifically, first, the travelable region 104 is set as shown in FIG. 20A by the process of step S503.

Figure 20B:
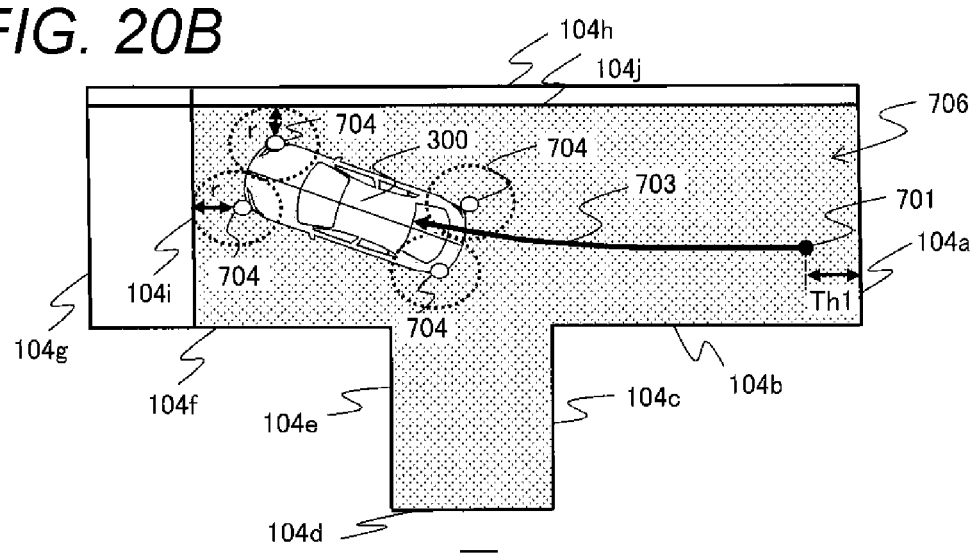
FIG. 20B is a plan view showing Example 5 of the present invention and showing an example of a set travelable region.

Next, the travelable region 706 based on the driver operation intervention information 450 is set by the above step S505 as shown in FIG. 20B. In step S506, the travel route generation process is performed on the travelable region 706, and when the travel route cannot be generated, the restriction of the travelable region 104 (706) is relaxed in step S2101.

Specifically, the line segment 104a of the line segments (104a to 104f, 104i, 104j) representing the travelable region 706 is located at a position away from the automatic parking start position 701 of the vehicle 300 by a predetermined value Th1, and this position is not a position determined based on the obstacle information, so that it is possible to change it.

Therefore, the route generation unit 403 moves the line segment 104a to the position of the line segment 2201a by a predetermined amount (increases Th1) (FIG. 20C) so that the travelable region 706 extend to perform the route generation process on the newly set travelable region 706. This increases the possibility of successful generation of the travel route.

Figure 20C:
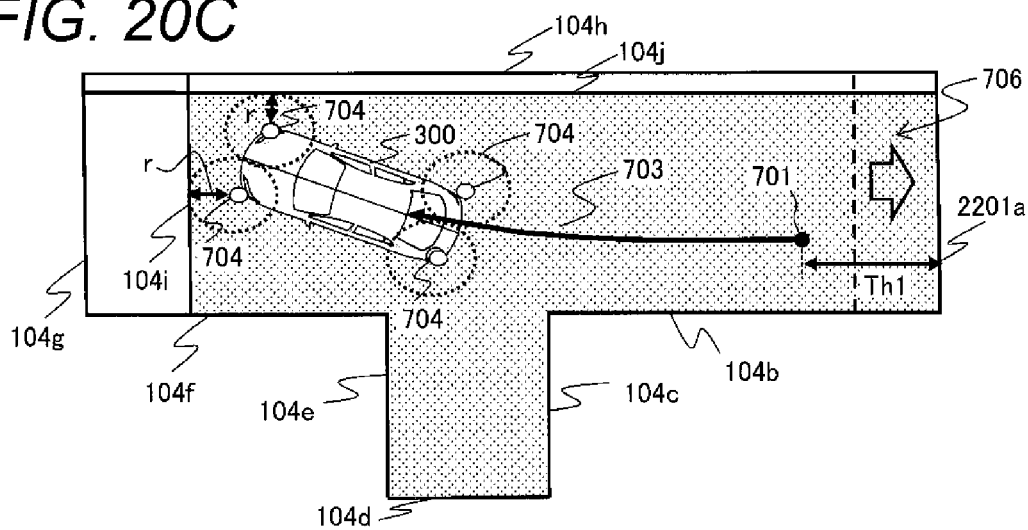
FIG. 20C is a plan view showing Example 5 of the present invention and showing an example of a set travelable region.

In addition, although the line segment 104a is explained in FIG. 20C, when each o other line segments (104b to 104f, and 104i) that are not changed based on driver operation intervention information 450 is not located at a position determined based on obstacle information, each line segment may be moved in the direction in which the travelable region extends. This increases the possibility of successful generation of the travel route.

In step S701, the route generation unit 403 calculates the reference vehicle speed pattern Vbase when the vehicle 300 travels on the travel route. This process is the same as in FIG. 7 of Example 1.

In step S702, the route generation unit 403 selects, from among the plurality of reference vehicle speed patterns calculated above, one reference vehicle speed for which the route generation process has not been completed, and the following route generation process is performed on the selected reference vehicle speed.

In step S703, as shown in FIG. 8 of Example 1, the route generation unit 403 calculates a travel route 1001 in which the vehicle can outgo without contacting the obstacle in the travelable region 706 from the state where the vehicle 300 is disposed in the target parking frame 601. This process is the same as in FIG. 7 of Example 1.

Next, in step S2102, the route generation unit 403 performs a connection route generation process by the one-sided steering with the restriction relaxed. The route generation unit 403 determines whether it is possible to be connected to the position calculated using the outgo route from the automatic parking start position 701 by the one-sided steering to store the route information when the connection is possible.

Here, in order not to give the driver a sense of discomfort, the route generation unit 403 performs the process of generating the connection route by the one-sided steering shown in step S904 of Example 1 only for the position 1002 (FIG. 8) at which the angle of the vehicle is larger than the angle of the vehicle 300 at the automatic parking start position 701.

However, when the travelable region 706 is reduced, it may not necessarily be possible to generate a travel route when the one-sided steering is performed so that the angle of the vehicle 300 is large. Therefore, in the connection route generation process (S2102) by the one-sided steering with the restriction relaxed, the route generation unit 403 performs the connection determination process by relaxing the conditions regarding the angle of the vehicle 300 for which the connection is determined (position 1002 at which the angle of the vehicle 300 is smaller than the angle at the automatic parking start position 701). The generation of the connection route by the one-sided steering is the same as that in Example 1.

Next, in step S2103, the route generation unit 403 performs a connection route generation process by the S-shaped steering with the restriction relaxed. The route generation unit 403 determines whether it is possible to be connected to the position 1002 calculated using the outgo route from the automatic parking start position 701 by the S-shaped steering to store the route information when the connection is possible. The generation of the connection route by the S-shaped steering is the same as that in Example 1.

Here, in order not to give the driver a sense of discomfort, the connection route generation S705 by the S-shaped steering of Example 1 is performed only for the position 1002 at which the vehicle angle is larger than the angle of the vehicle 300 at the automatic parking start position 701. However, when the travelable region 706 is reduced, it may not necessarily be possible to generate a travel route when the S-shaped steering is performed so that the angle of the vehicle 300 is large.

Therefore, in the connection route generation process (S2103) by the S-shaped steering with the restriction relaxed, the route generation unit 403 performs the connection determination process by relaxing the conditions regarding the angle of the vehicle 300 for which the connection is determined (position 1002 at which the angle of the vehicle 300 is smaller than the angle at the automatic parking start position 701).

Next, in step S706, the route generation unit 403 determines the end of the route generation process by the backward traveling start. The route generation unit 403 advances the process to step S707 when the travel route generation process by the backward traveling start has not been performed, and advances the process to step S708 when the generation process by the backward traveling start has already been completed.

In step S707, the route generation unit 403 performs the backward traveling start process. The backward traveling start process is the same as step S907 of Example 1. Since it is difficult to be connected to the route 1001 in which the vehicle can outgo by the one-sided steering and the S-shaped steering when the automatic parking start position 701 has passed the target parking frame 601, when the search for the connection route to the route in which the vehicle can outgo is successful at the next forward traveling after traveling backward once, the route generation unit 403 registers it as a route candidate (see FIG. 11).

In step S908, the route generation unit 403 determines whether generation of travel routes based on all the reference vehicle speed patterns has been completed. The route generation unit 403 generates a travel route by the forward traveling and backward traveling start for each reference vehicle speed pattern, and then completes generation of the candidates for the travel route.

In the above-mentioned example, only the vehicle parked backward in double is described, but the present invention is not limited to the parking situation, and it can be applied to the vehicle parked in parallel, the vehicle parked diagonally, and the vehicle parked forward.

As mentioned above, in Example 5, when the line segment of the travelable region 104 (706) is not a line segment determined based on obstacle information, the route generation unit 403 moves the line segment by a predetermined amount (increases Th1) so that the travelable region 706 extends (FIG. 20C), and performs the route generation process on the newly set travelable region 706. This increases the possibility of successful generation of the travel route.

Summary

As mentioned above, the vehicle control device of the above Examples 1 to 5 is the vehicle control device (324) that includes the processor (1) and the memory (2), that is mounted in the vehicle (300), and that controls the vehicle (300) to the target parking position (601), the vehicle control device includes the obstacle detection unit (325) that detects the position (103) of an obstacle (102) around the vehicle (300), the travelable region setting unit (401) that sets a region where the vehicle (300) is configured to travel as the travelable region (104) based on the position (102) of the obstacle (102), and that sets the target parking position (601) within the travelable region (104), the route generation unit (403) that calculates the travel route (703) to the target parking position (601) within the travelable region (104), and the automatic parking execution unit (470) that causes the vehicle to automatically travel toward the target parking position based on the travel route (703), wherein when a driver intervenes in a driving operation during the automatic traveling, the route generation unit (403) stores vehicle state information at a time of the intervention in driver operation intervention information (450), and resets the travelable region (706) based on the driver operation intervention information (450).

With the above configuration, when the intervention by the driver in the driving operation occurs during automatic parking, the operation history is recorded in the driver operation intervention information 450, and the travelable region 706 can be reset based on the operation history. As a result, the vehicle control device 324 changes a travelable region from the travelable region 104 set according to the surrounding environment to the travelable region 706 allowed by the driver to recalculate the travel route, so that it is possible to provide automatic parking that is comfortable to the driver. As a result, it is possible to reduce the intervention in the automatic parking by the driving operation by the driver, and to improve the safety and operability of the automatic parking.

Further, the route generation unit (403) moves the outer circumference (104a to 104j) of the travelable region (706) in a direction of reducing the travelable region (104) based on the driver operation intervention information (450) to reset the travelable region (706).

With the above configuration, the vehicle control device 324 changes a travelable region from the travelable region 104 set according to the surrounding environment to the travelable region 706 allowed by the driver to recalculate the travel route, so that it is possible to provide automatic parking that is comfortable to the driver.

Further, the route generation unit (403) moves the outer circumference (104a to 104j) of the travelable region 104 from the preset vehicle endpoint (706) to the preset distance (r) to reduce the travelable region 706.

With the above configuration, the vehicle control device 324 changes a travelable region from the travelable region 104 set according to the surrounding environment to the travelable region 706 allowed by the driver to recalculate the travel route, so that it is possible to provide automatic parking that is comfortable to the driver.

Further, the route generation unit (403) acquires vehicle state information on the travel route (703) during the automatic traveling to accumulate the acquired vehicle state information in traveling history information (460), determines, from the driver operation intervention information (450) at a position at which the driver intervenes in a driving operation and the traveling history information (460), part whose change is allowed and part whose change is prohibited of the outer circumference (104a to 104j) of the travelable region (104).

With the above configuration, since the position on the travel route that the vehicle has already passed holds the distance d (dx or dy) allowed by the driver, by suppressing the extension of the new distance d beyond the minimum distance dmin allowed by the driver, it is possible to prohibit the travelable region 706 from being reduced more than necessary.

Further, the traveling history information (460) includes a distance between a position of a vehicle and an outer circumference of the travelable region (104) at predetermined intervals on the travel route (703) as state information of the vehicle, and wherein the route generation unit (403) prohibits, from the driver operation intervention information (450) at the position (707) at which the driver intervenes in a driving operation and the traveling history information (460), a movement of the outer circumference in a direction in which the distance is larger than a distance (dmin) between a position on the travel route (703) that the vehicle has already passed and the outer circumference at the position (707) at which the intervention occurs.

With the above configuration, since the position on the travel route that the vehicle has already passed holds the distance d (dx or dy) allowed by the driver, by suppressing the extension of the new distance d beyond the minimum distance dmin allowed by the driver, the route generation unit 403 can prohibit the travelable region 706 from being reduced more than necessary.

Further, the traveling history information (460) includes a distance between a position of a vehicle and an outer circumference of the travelable region (104) at predetermined intervals on the travel route (703) as state information of the vehicle (300), and wherein the route generation unit (403) permits, from the driver operation intervention information (450) at the position (707) at which the driver intervenes in a driving operation and the traveling history information (460), a movement of the outer circumference in a direction in which the distance is smaller than a distance between a position on the travel route (703) that the vehicle has already passed and the outer circumference at the position (707) at which the intervention occurs.

With the above configuration, while the route generation unit 403 moves the outer circumference (line segment 104g) of the travelable region 104 according to the driving operation by the driver to set the outer circumference (line segment 104i) of the new travelable region 706, it prevents the travelable region 706 from being inadvertently reduced (movement to the dy side), so that it is possible to secure the degree of freedom in setting the new travel route 703.

Further, when receiving a resetting prohibition command from the driver, the route generation unit (403) prohibits resetting of the travelable region 104.

As a result, when a command from the driver is input due to the movement obstacle 102a and the like by prohibiting the setting of the travelable region 706, it is possible to prevent the travelable region 706 from being inadvertently reduced.

In addition, when the travel route (703) to the target parking position (601) is not allowed to be set within the travelable region (104), the route generation unit (403) relaxes the restriction of the travelable region (104). This increases the possibility of successful generation of the travel route.

Further, the route generation unit (403) changes the travelable region (706) in a direction of extending the travelable region (706) to relax the restriction.

With the above configuration, when the line segment of the travelable region 104 (706) is not a line segment determined based on obstacle information, the route generation unit 403 moves the line segment by a predetermined amount (increases Th1) so that the travelable region 706 extends (FIG. 20C), and performs the route generation process on the newly set travelable region 706.

Further, the route generation unit (403) sets the reduced travelable region based on an outer circumference on an extension of a vehicle traveling direction when the intervention in the driving operation occurs.

With the above configuration, the route generation unit 403 can select the line segments 104g and 104h of the travelable region 104 to be changed at the position 707 of the vehicle 300 based on the angle of the vehicle body (a1, a2 in FIG. 5A), and the traveling direction before the intervention by the driver in the driving operation.

The automatic parking execution unit (470) automatically controls at least one of a steering operation, a brake operation, an accelerator operation, and a shift operation during the automatic traveling.

Further, the route generation unit (403) deletes the traveling history information (460) when the vehicle (300) reaches the target parking position (601).

The above configuration enables automatic parking according to the characteristics and preferences of different drivers when the drivers drive.

The route generation unit (403) deletes the traveling history information (460) when it receives a command from the driver.

The above configuration enables automatic parking according to the characteristics and preferences of different drivers when the drivers drive.

The present invention is not limited to the embodiments described above, but includes various modifications.

For example, the above-described embodiments have been described in detail for easy understanding of the present invention, and the present invention is not necessarily limited to embodiments having all the configurations described. Moreover, it is possible to replace part of the configuration of an embodiment with the configuration of another embodiment, and it is also possible to add the configuration of another embodiment to the configuration of an embodiment. Further, for part of the configurations of each embodiment, any of addition, deletion, or replacement of other configurations can be applied alone or in combination.

Further, part or all of the above-described respective configurations, functions, processing units, processing means, and the like may be realized by hardware, for example, by designing them with an integrated circuit. Further, the above-described respective configurations, functions, and the like may be realized by software with the processor interpreting and executing programs for realizing the respective functions. Information such as programs, tables, and files that implement each function is stored in memory and it can be placed in a recording device such as a hard disk or a solid state drive (SSD), or a recording medium such as an IC card, an SD card, or a DVD.

In addition, the control lines and information lines indicate those that are considered necessary for explanation, and do not necessarily indicate all the control lines and information lines in the product. In practice, it may be considered that almost all configurations are connected to each other.

REFERENCE SIGNS LIST 102 obstacle
103 obstacle position information
104 travelable region
105 turning position
106 target parking position
107 planned movement route
300 vehicle
310 power generation mechanism
311 brake
312 transmission
313 steering wheel
314 wheel
320 driving force control device
321 brake control device
322 steering control device
323 transmission control device
324 vehicle control device
325 surrounding state recognition sensor
326 vehicle speed sensor
401 parking target candidate presentation unit
402 self-position estimation unit
403 route generation unit
404 target steering angle calculation unit
405 target vehicle speed calculation unit
406 target braking/driving force calculation unit
407 forward/backward traveling switching determination unit
601 target parking frame
701 parking start position

The invention claimed is:

1. A vehicle control device for a vehicle, the vehicle control device comprising:
   a sensor;
   a memory that stores past driver operation intervention information for each of a plurality of drivers of the vehicle, wherein the past driver operation intervention information indicates a previous location where a respective driver of the vehicle intervened to control the vehicle when the vehicle was previously parked; and one or more processors communicatively coupled to the sensor and the memory, the one or more processors collectively configured to:
(a) detect, using the sensor, a position of an obstacle around the vehicle,
(b) detect, using the sensor, a current location of the vehicle,
(c) set a region where the vehicle is configured to travel as a travelable region based on the position of the obstacle,
(d) determine a plurality of candidate parking positions within the travelable region based on the obstacle,
(e) receive a selection of a target parking position from the plurality of candidate parking positions, the selection being received in response to displaying the plurality of candidate parking positions to a current driver,
(f) reset the travelable region by moving at least a portion of an outer boundary of the travelable region toward the vehicle so that the previous location at which the current driver intervened lies outside the reset travelable region and by prohibiting generation of any segment of a travel route that passes within a preset clearance distance of the previous location,
(g) calculate a new travel route to the target parking position within the reset travelable region based on a comparison of the current location with the previous location and the past driver operation intervention information for the current driver stored in the memory,
(h) cause the vehicle to automatically travel toward the target parking position based on the new travel route, and
(i) when the current driver intervenes in a driving operation while the vehicle is automatically traveling toward the target parking position, store, in the memory, vehicle state information at a time of the current driver's intervention.

2. The vehicle control device according to claim 1, wherein the one or more processors are further collectively configured to:
displace the outer boundary of the travelable region by an offset distance that is equal to or greater than a distance between the vehicle and the outer boundary that existed at reducing the travelable region based on the driver operation intervention information for the current driver.

3. The vehicle control device according to claim 2, wherein the one or more processors are further collectively configured to:
adjust the travelable region from a preset vehicle endpoint to a preset distance to reduce the travelable region.

4. The vehicle control device according to claim 1, wherein:
the memory further stores traveling history information that includes a distance between a respective position of the vehicle and an outer region of the travelable region at predetermined intervals on the travel route as state information of the vehicle, and wherein the one or more processors are further collectively configured to:
prohibit movement of the outer region in a direction in which the distance is larger than a respective distance between a first position on the travel route that the vehicle has already passed and the outer region at a second position at which the current driver intervenes.

5. The vehicle control device according to claim 1, wherein
the memory further stores traveling history information that includes a distance between a respective position of the vehicle and an outer region of the travelable region at predetermined intervals on the travel route as state information of the vehicle, and wherein the one or more processors are further collectively configured to:
allow movement of the outer region in a direction in which the distance is smaller than a respective distance between a first position on the travel route that the vehicle has already passed and the outer region at a second position where the respective driver intervenes.

6. The vehicle control device according to claim 1, wherein the one or more processors are further collectively configured to:
when receiving a resetting prohibition command from the current driver, prohibit resetting of the travelable region.

7. The vehicle control device according to claim 2, wherein the one or more processors are further collectively configured to:
when the travel route to the target parking position is not allowed to be set within the travelable region, relax a restriction of the travelable region.

8. The vehicle control device according to claim 7, wherein the one or more processors are further collectively configured to:
change the travelable region in a direction of extending the travelable region to relax the restriction.

9. The vehicle control device according to claim 2, wherein the one or more processors are further collectively configured to:
automatically control at least one of a steering operation, a brake operation, an accelerator operation, or a shift operation during the automatic traveling.

10. The vehicle control device according to claim 1, wherein the one or more processors are further collectively configured to:
delete a portion of the driver operation intervention information when a command from the current driver is received.

* * * * *